United States Patent
Wang et al.

(10) Patent No.: US 10,924,175 B2
(45) Date of Patent: Feb. 16, 2021

(54) BEAM MANAGEMENT PROCEDURE TRIGGERING AND SIGNALING DELIVERY IN FALL-BACK MODE

(71) Applicant: Apple Inc., Cupertino, CA (US)

(72) Inventors: Guotong Wang, Beijing (CN); Yushu Zhang, Beijing (CN); Alexei Davydov, Nizhny Novgorod (RU); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/489,913

(22) PCT Filed: Apr. 2, 2018

(86) PCT No.: PCT/US2018/025622
§ 371 (c)(1),
(2) Date: Aug. 29, 2019

(87) PCT Pub. No.: WO2018/183991
PCT Pub. Date: Oct. 4, 2018

(65) Prior Publication Data
US 2020/0067590 A1   Feb. 27, 2020

Related U.S. Application Data

(60) Provisional application No. 62/480,112, filed on Mar. 31, 2017, provisional application No. 62/502,524, filed on May 5, 2017.

(51) Int. Cl.
*H04B 7/06* (2006.01)
*H04B 17/318* (2015.01)
(Continued)

(52) U.S. Cl.
CPC ......... *H04B 7/0695* (2013.01); *H04B 7/0617* (2013.01); *H04B 7/0632* (2013.01);
(Continued)

(58) Field of Classification Search
CPC .. H04B 7/0617; H04B 7/0632; H04B 7/0695; H04B 7/0857; H04B 7/0868;
(Continued)

(56) References Cited

U.S. PATENT DOCUMENTS

| | | | |
|---|---|---|---|
| 2011/0110453 A1 | 5/2011 | Prasad et al. | |
| 2012/0008563 A1* | 1/2012 | Johansson | H04W 52/146 370/328 |

(Continued)

FOREIGN PATENT DOCUMENTS

WO   2016/190653 A1   12/2016

OTHER PUBLICATIONS

International Search Report dated Jun. 25, 2018 for International Application No. PCT/US2018/025622.

(Continued)

*Primary Examiner* — David B Lugo
(74) *Attorney, Agent, or Firm* — Eschweiler & Potashnik, LLC

(57) ABSTRACT

Network devices and systems in 5G and new radio (NR) infrastructures can utilize beam management operations to ensure communications for beam management procedure triggering including beam reporting, even during fall-back mode when the current receive (Rx) beam for downlink (DL) and transmit (Tx) beam for uplink (UL) fail. Additionally, reduction in overhead can be achieved with a reference beam pair link based beam reporting in a fall-back mode or not. This beam reporting can be a group based beam reporting and based on Reference Signal Received Powers (RSRPs) of beams and a differential RSRP corresponding thereto.

23 Claims, 13 Drawing Sheets

(51) Int. Cl.
*H04B 7/08* (2006.01)
*H04W 52/36* (2009.01)
*H04W 72/04* (2009.01)
*H04W 72/08* (2009.01)

(52) U.S. Cl.
CPC ......... *H04B 7/0857* (2013.01); *H04B 7/0868* (2013.01); *H04B 17/318* (2015.01); *H04W 52/365* (2013.01); *H04W 72/046* (2013.01); *H04W 72/085* (2013.01)

(58) Field of Classification Search
CPC .................. H04B 17/318; H04W 52/365; H04W 72/046; H04W 72/085
See application file for complete search history.

(56) References Cited

U.S. PATENT DOCUMENTS

| | | |
|---|---|---|
| 2015/0382268 A1 | 12/2015 | Hampel et al. |
| 2018/0159600 A1 | 6/2018 | Kim et al. |
| 2020/0059290 A1* | 2/2020 | Pan .................. H04B 7/088 |
| 2020/0059398 A1* | 2/2020 | Pan .................. H04L 41/0654 |
| 2020/0136708 A1* | 4/2020 | Pan .................. H04B 7/0617 |

OTHER PUBLICATIONS

International Preliminary Report on Patentability dated Oct. 1, 2019 for International Application No. PCT/US2018/025622.

\* cited by examiner

BEAM MANAGEMENT PROCEDURE TRIGGERING AND SIGNALING DELIVERY IN FALL-BACK MODE

REFERENCE TO RELATED APPLICATIONS

This application is a National Phase entry application of International Patent Application No. PCT/US2018/025622 filed Apr. 2, 2018, which claims priority to claims the benefit of U.S. Provisional Application 62/480,112 filed Mar. 31, 2017, entitled "A METHOD FOR BEAM MANAGEMENT PROCEDURE TRIGGERING AND SIGNALING DELIVERY IN FALL-BACK MODE" and the benefit of U.S. Provisional Application 62/502,524 filed May 5, 2017, entitled "REFERENCE BEAM BASED BEAM REPORTING IN NEW RADIO SYSTEMS", and is hereby incorporated by reference in its entirety.

FIELD

The present disclosure relates to wireless technology, and more specifically to techniques for signaling transmissions for beamforming systems based on beam management procedure triggering and signaling delivery in fall-back mode.

BACKGROUND

The explosive wireless traffic growth leads to an urgent need of rate improvement. With mature physical layer techniques, further improvement in the spectral efficiency could be marginal. On the other hand, the scarcity of licensed spectrum in low frequency band results in a deficit in the data rate boost. The next generation wireless communication system, 5G, will provide access to information and sharing of data anywhere, anytime by various users and applications. 5G is expected to be a unified network/system that target to meet vastly different and sometime conflicting performance dimensions and services. Such diverse multi-dimensional requirements are driven by different services and applications. In general, 5G could evolve based on 3GPP long term evolution (LTE) advanced (LTE-Adv) with additional potential new Radio Access Technologies (RATs) to enrich people lives with better, simple and seamless wireless connectivity solutions. 5G will enable many devices to be connected by wireless communications and deliver fast, rich contents and services Similar to LTE, multiple antenna techniques can be a key technology component in 3GPP 5G new radio (NR) systems. Specifically, beamforming with very narrow beam width, leading to high beamforming gain, can be an important tool for high frequency NR to achieve target coverage. To operate in a wide frequency range from below 6 GHz to 100 GHz, for example, 3GPP NR aims to provide a unified approach to realize single and multi-beam transmission.

5G NR, beamforming will be utilized at both a Transmission Reception Point (TRP) (e.g., eNodeB/Next Generation NodeB/base station antenna panel) and the user equipment (UE). Beam management is used to acquire and maintain the RP and UE beams for communication. For downlink (DL), the beam management procedures include: P-1, P-2 and P-3 beam management procedures. The P-1 beam management procedure is to obtain the initial TRP transmit (Tx) beam and UE receive (Rx) beam. The P-2 beam management procedure is to enable the TRP Tx beam refinement and P-3 is to enable the UE Rx beam refinement. For uplink (UL), the beam management procedures include: U-1, U-2 and U-3 beam management procedures. Similarly, the U-1 beam management procedure is to obtain the initial UE Tx beam and TRP Rx beam. The U-2 beam management procedure is to enable TRP Rx beam refinement and U-3 beam management procedure is to enable the UE Tx beam refinement.

Sometimes issues arise for beam management procedure triggering, including beam reporting. For example, when the UE rotates or is blocked, the current Rx beam for DL and Tx beam for UL will not work. In this case, both DL and UL communication fail to send information to trigger the beam refinement procedure.

DETAILED DESCRIPTION

Figure 1:
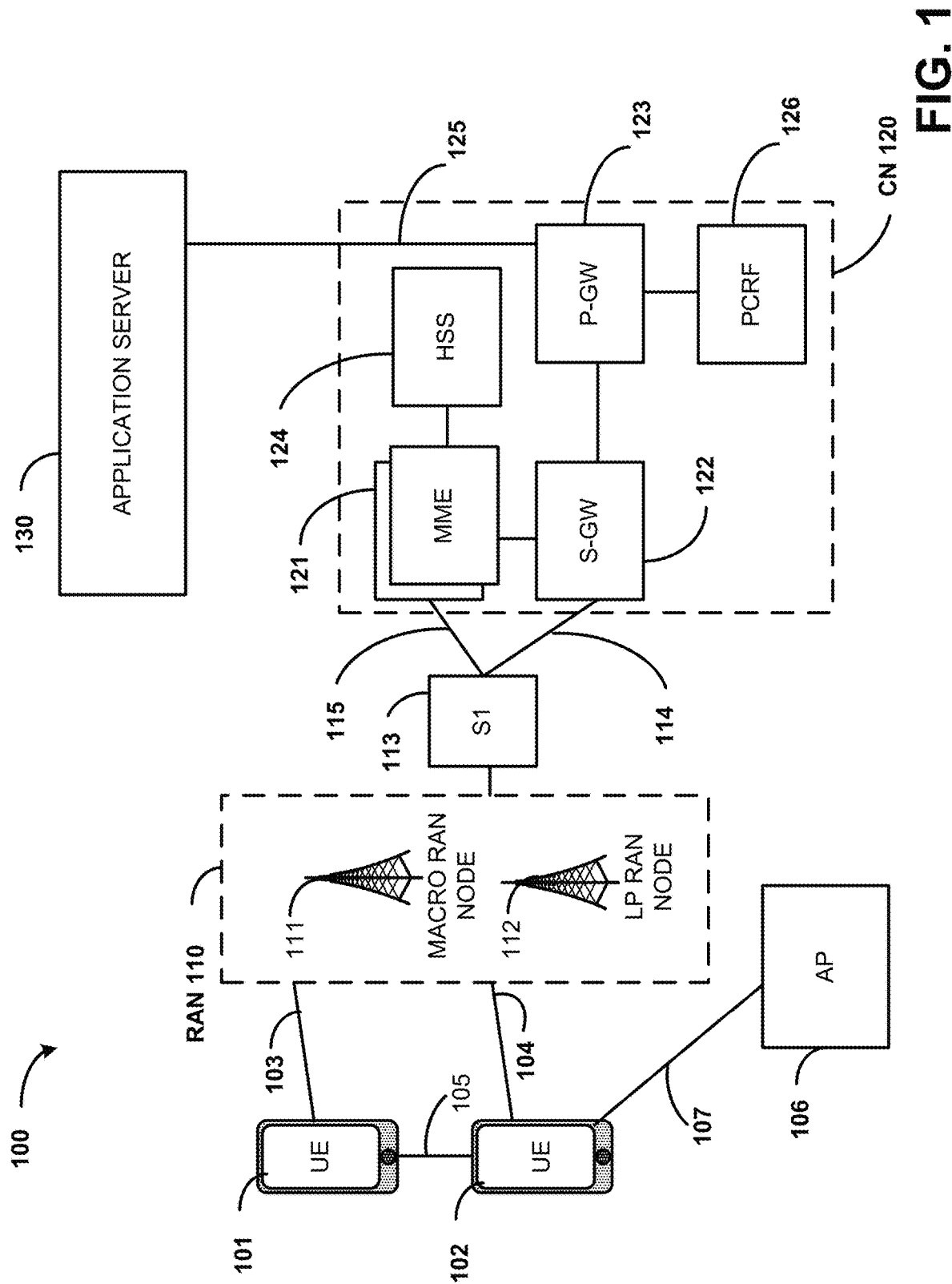
FIG. 1 is a block diagram illustrating an example network system with a UE, and eNB/gNB in a core network useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

OVERVIEW

In consideration of the above, various aspects/embodiments are disclosed for communications in a beamformed system or beamforming network device (e.g., user equipment (UE), evolved NodeB (eNB), a next generation NodeB (gNB), new radio (NR) base station (BS), a multi-input multi-output (MIMO) device, single-input multi-output (SIMO) device, or the like). In particular, with respect to 5G NR devices, issues can arise for beam management procedure triggering, including beam reporting. For example, when the UE rotates or is blocked, the current Rx beam for DL and Tx beam for UL will not necessarily work as expected. In this case, both DL and UL communication fail and there is no way to send information to trigger the beam refinement procedure. As such, various embodiments/aspects are disclosed to enable the UE to send information in fall-back mode and trigger the beam refinement procedure when rotation/blockage happens. These include aspects related to triggering specific beam management operations separately or together, delivery mechanisms in fall-back mode, and UL beam management control between the Transmission Reception Point (TRP) (e.g., antenna panel communicatively coupled to, or a part of, the eNB/gNB/BS/UE/bandwidth limited (BL) UE).

In the 5G NR system, beam forming can be used at both the TRP side (e.g., eNB/gNB) and the UE side. Beam management is used to acquire and maintain TRP and UE beams for communication. For downlink, the beam management procedures include: P-1, P-2 and P-3. In particular, the P-1 beam management procedure is to obtain the initial TRP Tx beam and UE Rx beam. In this operation, the UE measures different TRP Tx beams to select the initial TRP Tx beam/initial Rx beam. Additionally, the P-2 beam management procedure is to enable the TRP Tx beam refinement. Here, the TRP Tx beam is swept while the UE keeps the same Rx beam. In response thereto, the UE can reselect the TRP Tx beam based on this refinement operation within the same antenna panel, antenna group, beam group or outside thereof, based on associated measurements. The P-3 beam management procedure further enables UE Rx beam refinement. Here, the TRP Tx beam is sent with repetition and the UE Rx beam is swept in order to enable a reselection or potential refinement by the UE for a UE Rx beam within the same antenna panel, antenna group, beam group or outside thereof, based on associated measurements.

Likewise, for uplink, the beam management procedures include: U-1, U-2 and U-3. Similar to downlink beam management procedures, the U-1 beam management procedure is for the TRP, or associated network device, to obtain the initial UE Tx beam and TRP Rx beam. Additionally, the U-2 beam management procedure is to enable TRP Rx beam refinement/reselection, and U-3 is to enable the UE Tx beam refinement/reselection by the TRP.

In additional embodiments/aspects herein, for downlink P-1 beam management procedure, the TRP periodically broadcasts beamformed reference signals (e.g., a Channel State Information (CSI) Reference Signal (CSI-RS), a Cell Specific Reference Signal (CRS), or the like). After measurement, the UE reports to the TRP which Tx beams are good for communications. The reporting content can include the Tx beam index or beam pair link (BPL) index, as well as one or more Reference Signal Received Powers (RSRPs). Considering a large number of beams, the overhead for beam state reporting can also be high.

In order to reduce the overhead, various embodiments/aspects provide that group based beam reporting can be utilized. In at least one embodiment, for example, the group based beam reporting can be an Rx beam set based reporting, in which different Tx beams reported for a same set can be simultaneously received by the UE, thereby constituting a same beam group or beam set of the Tx beams. In at least one other embodiment, for example, the group based beam reporting can comprise Rx antenna group/antenna panel based reporting, in which different Tx beam reported from different antenna panel/antenna group can be simultaneously received by the UE.

In another aspect, in order to further reduce the overhead meanwhile to provide as much information as possible to the network side, a reference beam pair link based beam reporting can also be utilized. In one example, the UE can set one beam pair link (BPL) as the reference beam, which is used by the TRP for downlink communication. Further, the remaining beam pairs could be reported based on the reference beam pair. For example, the differential RSRP could be reported and the relation with the reference beam could be indicated based on whether the beam is in the same group/antenna panel/Rx beam set with the reference beam. The differential RSRP as referred to herein can be defined as the difference between the RSRP corresponding to the reference beam and beam for which RSPR is provided.

Additional aspects and details of the disclosure are further described below with reference to figures.

Embodiments described herein can be implemented into a system using any suitably configured hardware and/or software. FIG. 1 illustrates an architecture of a system 100 of a network in accordance with some embodiments herein. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
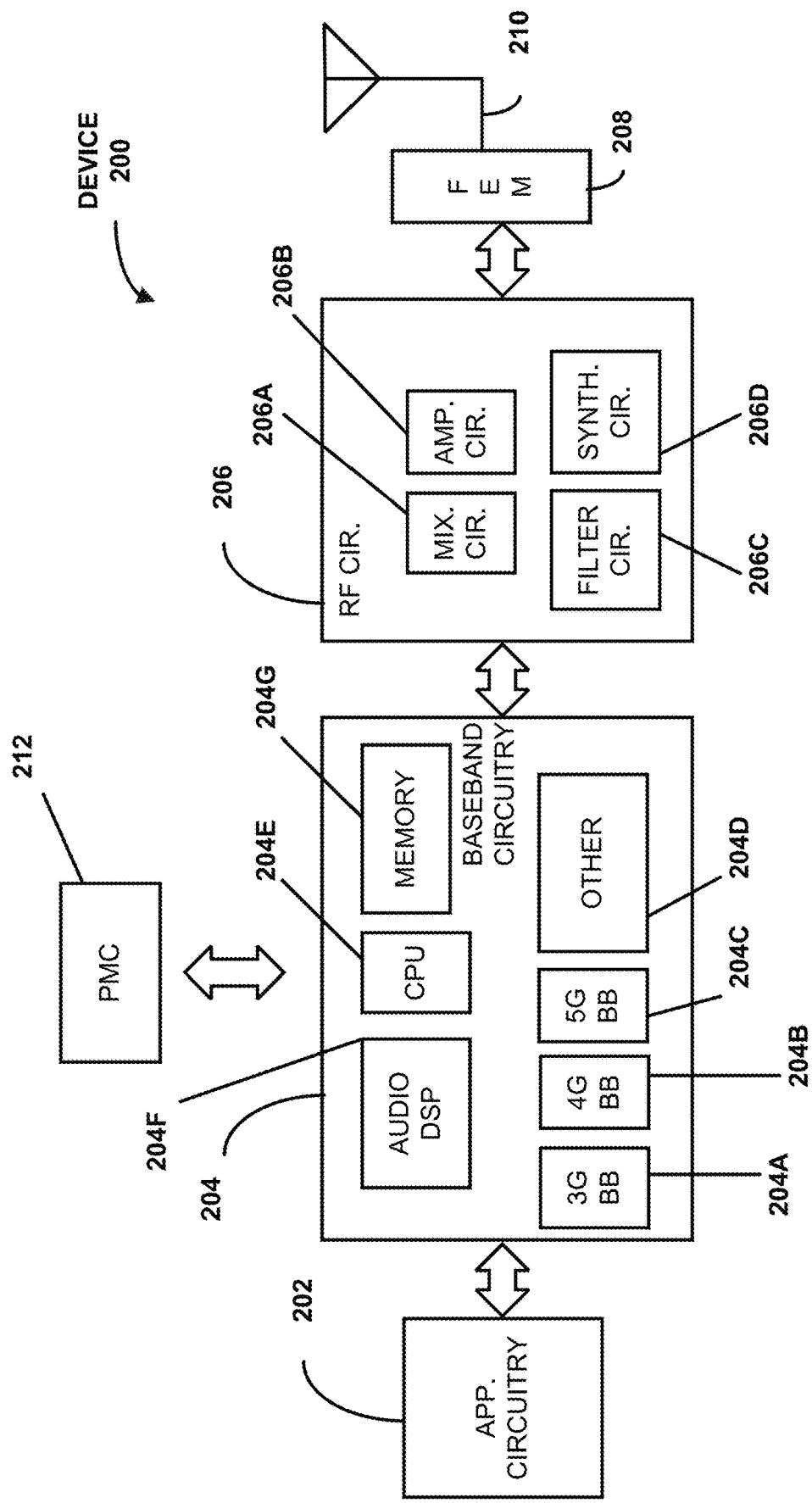
FIG. 2 is a diagram illustrating example components of a network device as a UE or eNB/gNB that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a gNB, eNB, UE, a RAN node or other network device incorporating one or more various aspects/embodiments herein. In some embodiments, the device 200 can include less elements (e.g., a RAN node could not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry

206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
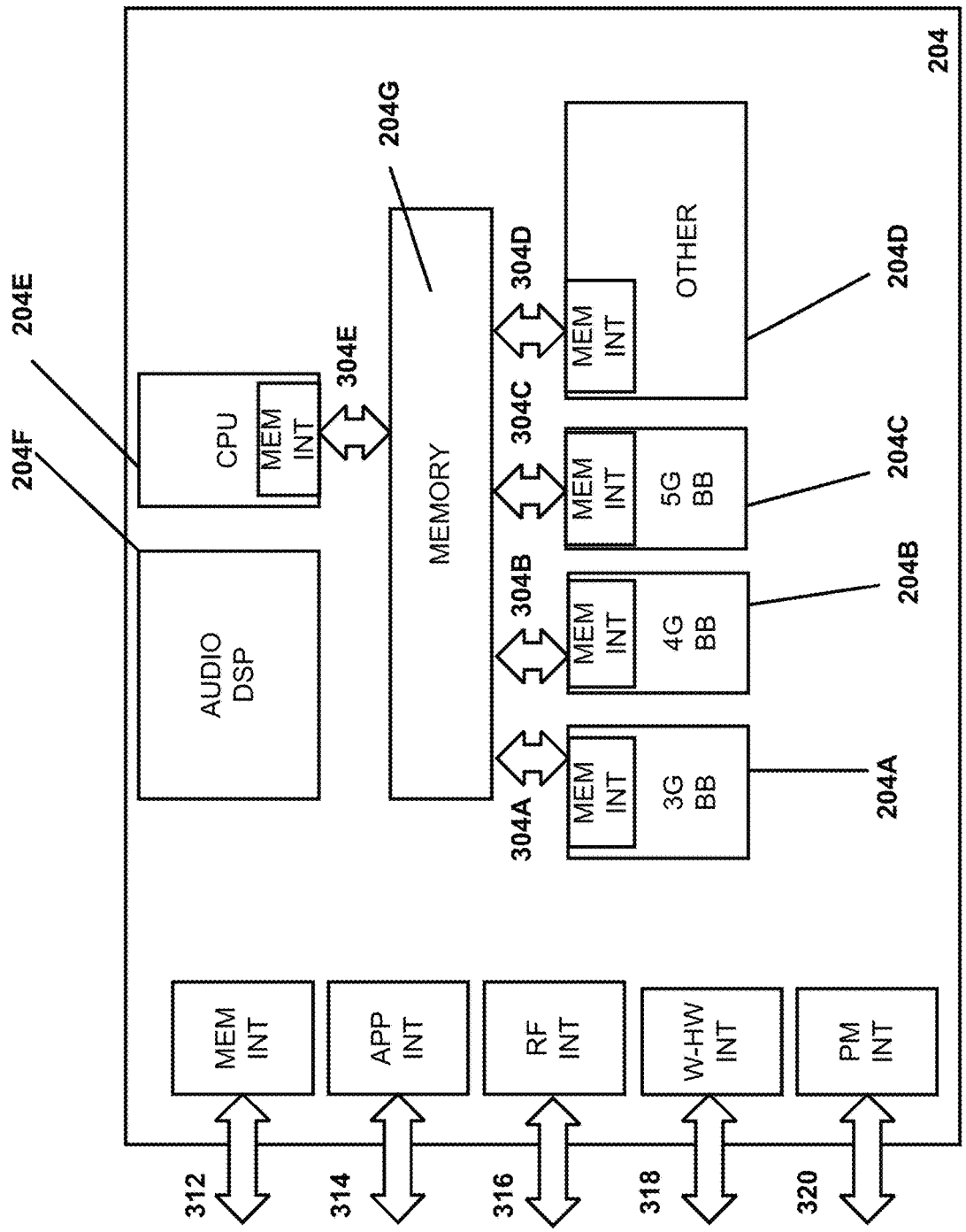
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
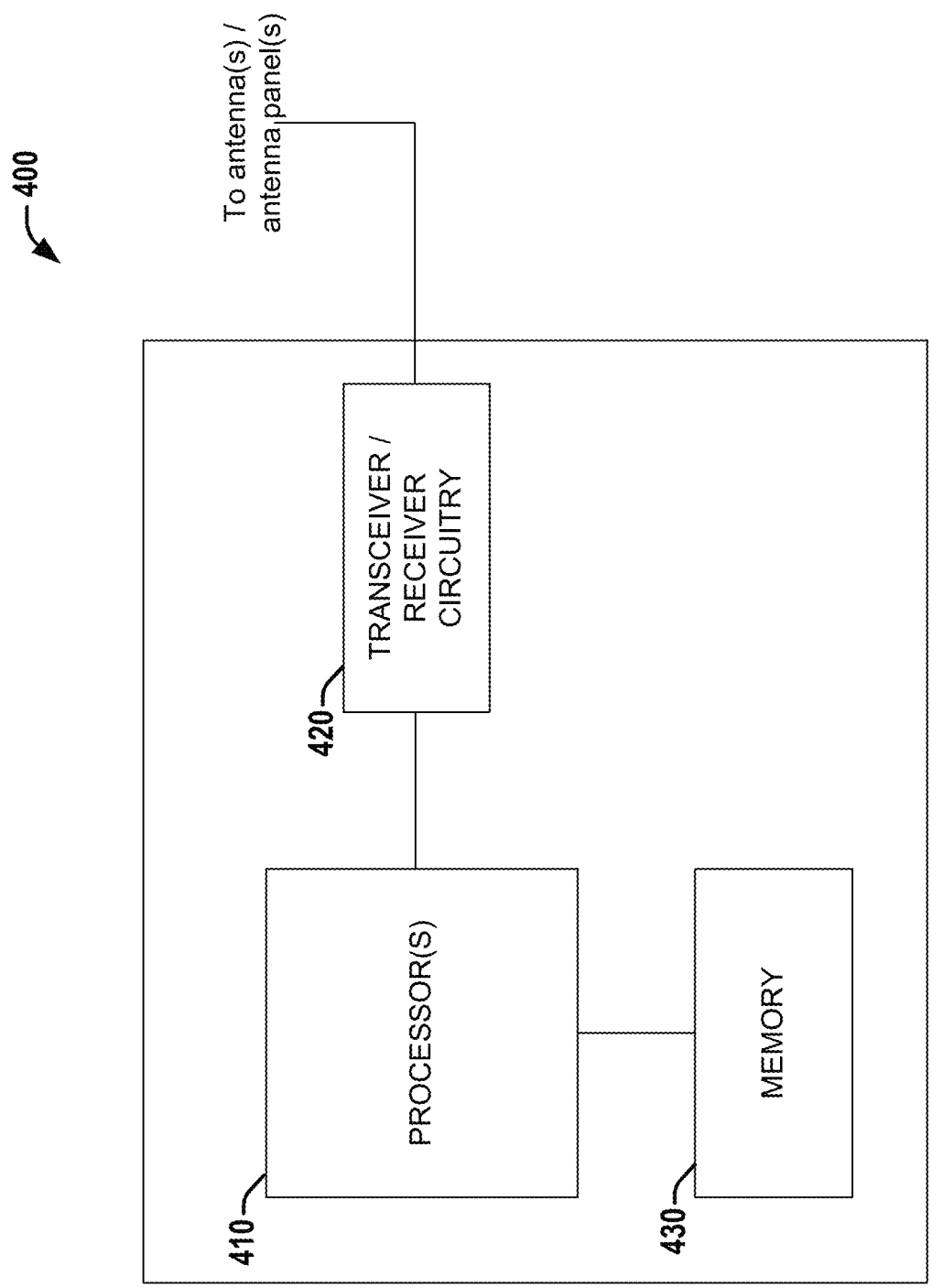
FIG. 4 is a block diagram illustrating a system employable at a UE that enables beam reporting and beam management procedures, according to various aspects described herein.

Referring to FIG. 4, illustrated is a block diagram of a system 400 employable at a UE (User Equipment) that facilitates or enables greater power efficiency beam management and delivery in fall-back mode, as well as beam state reporting according to one or more group or reference BPL based reporting operations, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE), for example, a MTC UE. As described in greater detail below, system 400 can facilitate greater power efficiency for beam management operations, including beam management procedure triggering (e.g., for P-1 thru P3 in downlink, and U-1 thru U-3 for uplink), signaling for beam recovery in fall-back mode when the UE experiences a failure in the UE Rx beam and TRP Tx beam as a beam pair link (BPL), group based beam reporting and reference BPL based beam reporting.

Figure 5:
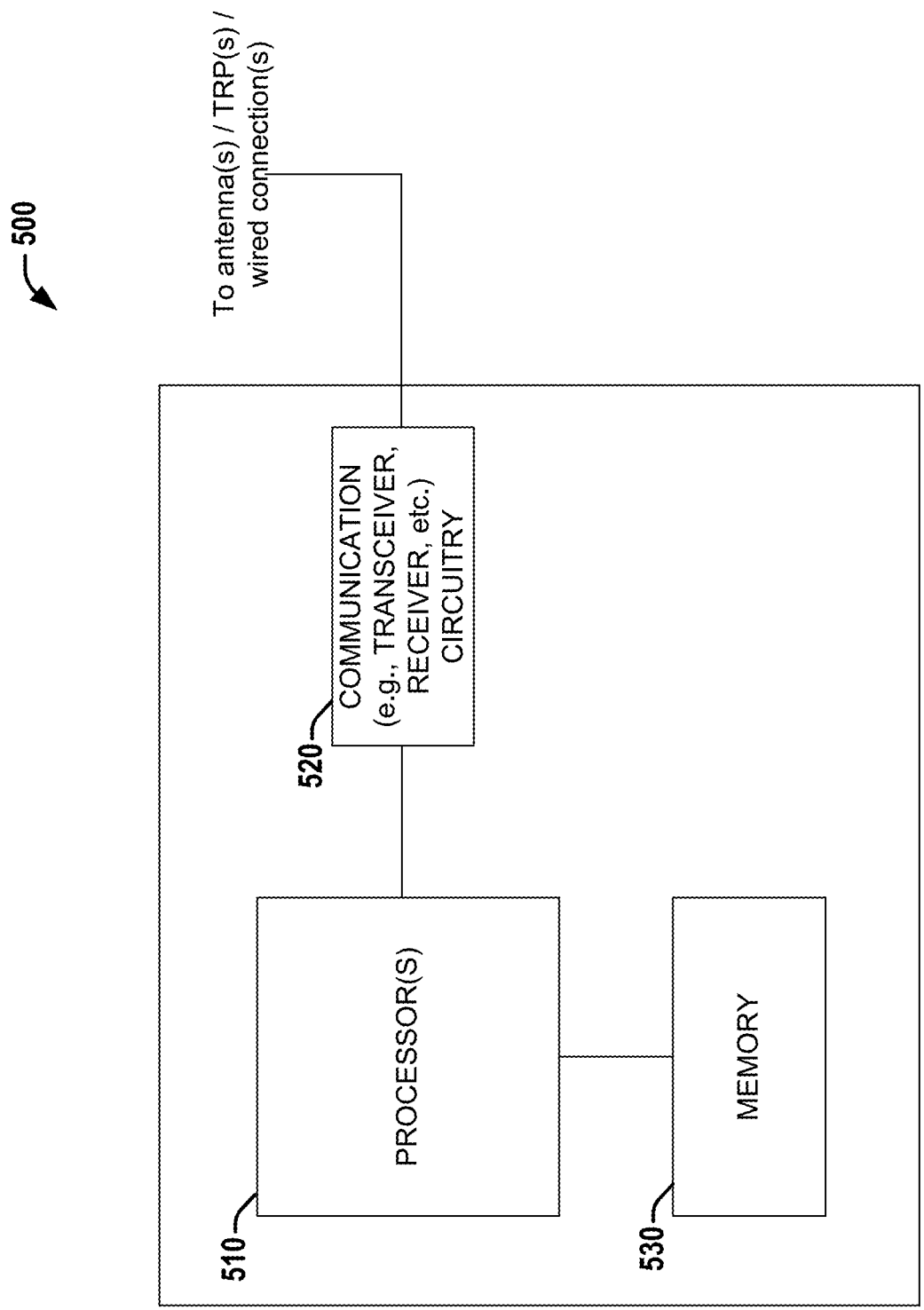
FIG. 5 is a block diagram illustrating a system employable at a base station (BS)/evolved NodeB (eNB)/new radio/next generation NodeB (gNB) that enables beam reporting and beam management procedures, according to various aspects described herein.

Referring to FIG. 5, illustrated is a block diagram of a system 500 employable at a BS (Base Station), gNB, eNB or other network device/component that facilitates enables beam management and delivery in fall-back mode, as well as beam state reporting according to one or more group or reference BPL based reporting operations, according to various aspects described herein. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can enable beam management and delivery in fall-back mode, as well as beam state reporting according to one or more group or reference BPL based reporting operations as well as support beam repetitions (e.g., single-beam repetition, omni reception, multi-beam repetitions, beam sweeping, or the like) corresponding to these operations.

Figure 6:
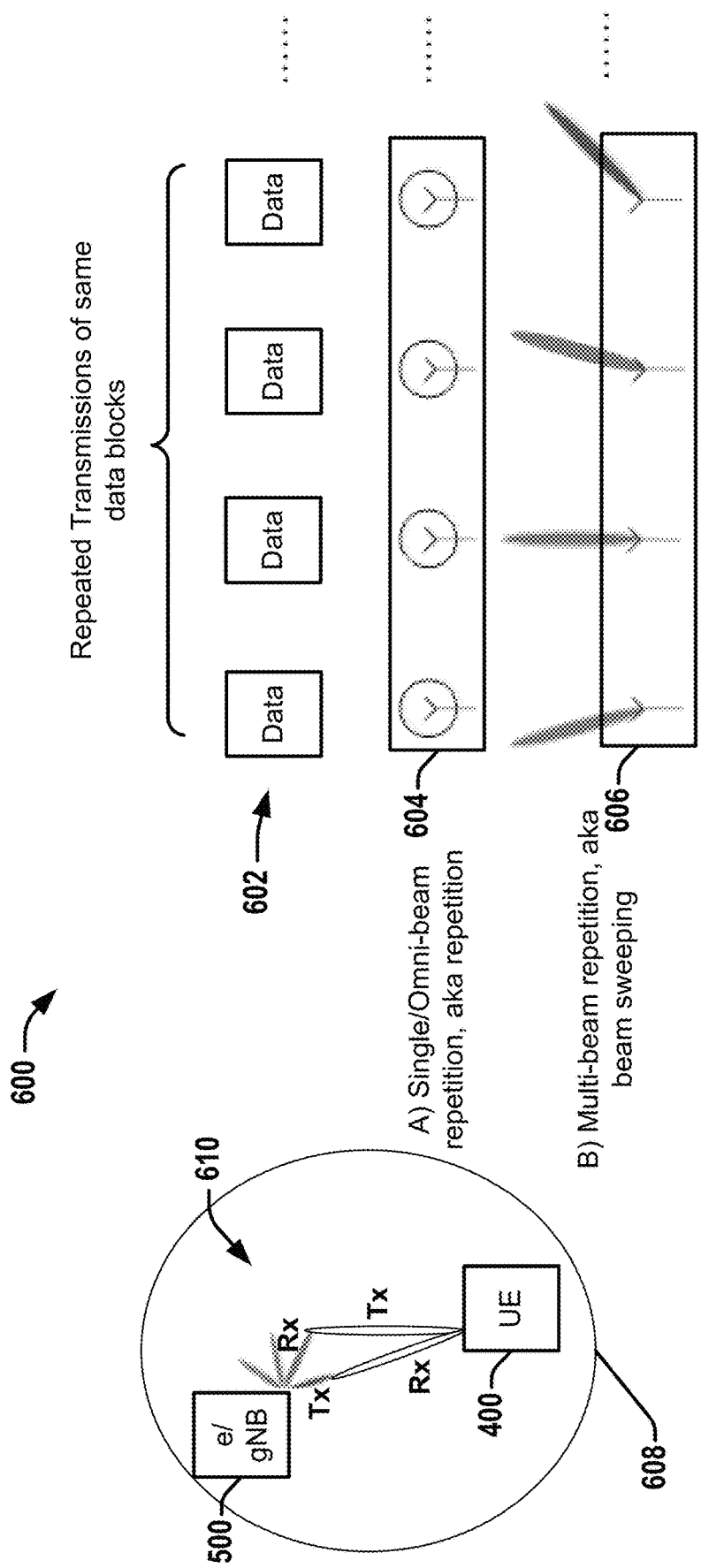
FIG. 6 illustrates a transmission configuration/structure for beam management reporting and beam management procedure triggering and signaling operations or procedures according to various aspects or embodiments described herein.

In various aspects/embodiments, components are discussed to configure support for beam management procedure(s) and related operations. Referring briefly to FIG. 6, illustrated is an eNB/gNB 500 beamforming based system 600 in accordance with various aspects/embodiments. The repeated data blocks 602 can be transmitted or received in an omni-directional manner via one or more antenna(s), antenna panels, antenna groups 604, as single-beam repetition or antenna group/panel based repetition. The repeated data blocks 602 can also be transmitted or received in a multi-beam manner via antenna(s) 606, as multi-beam repetition or beam sweeping in a directional manner. Antenna(s) 604 and 606 can be the same antenna group(s)/panel(s), Rx/Tx beams, or different antenna(s) that can generate different beam forming operations based on aspects/embodiments/criteria/parameters described herein.

In long term evolution (LTE) 5G NR beam operations such as TRP/UE Tx/Rx beams 610 can be generated/provided/transmitted/received via the processor 510 of the eNB/gNB 500 and generated/provided/transmitted/received (e.g., via communication circuitry 520 and antenna(s) 604 or 606) by the processor 410 of the UE 400 (e.g., via transceiver circuitry 420 and from other antennas (not shown) similar to 604 or 606, for example). For example, the data blocks 602 can be transmitted by one or more antennas such that one or more antennas transmit or receive (e.g., the same data) repeatedly in all directions/omni-directionally as shown in antenna panel 604 or directional reception/transmission as shown in antenna panel 606, for example.

In various aspects of the multi-beam operations/system of antenna(s) 606, the beam sweeping can be utilized to broadcast some information (e.g., system information) and corresponding beamformed reference signals such as CSI-RS, CRS or the like. For example, the system information and signal carriers can include a Master Information Block (MIB), System Information Block (SIB) and a Synchronization Signal (SS) including Primary Synchronization Signal (PSS), Secondary Synchronization Signal (SSS) or Extended Synchronization Signal (ESS). The beam sweeping can also be applied to a Beam Reference Signal (BRS) transmission, which can be used for the measurement of a beam quality by a UE 400, for example.

In one embodiment, P-2/P-3 beam management procedures, and U-2/U-3 beam management procedures can be triggered separately and independently of one another according to certain mechanisms. For downlink, generally P-1 is performed periodically and P-2/P-3 beam management procedures can be aperiodic. One way to trigger P-2/P-3 beam management procedures is based on beam state reporting. For example, after the P-1 beam management procedure several beam pair links (BPLs) are selected by the UE 400 and reported to gNB 500 via one or more TRPs. The TRP/gNB 500 can evaluate the beam quality based on the beam reporting. If the quality degrades, for example due to blockage or UE rotation, then some beam management procedure is performed. However, it is difficult for the TRP/gNB 500 or the UE 400 to tell whether the beam quality degradation is caused by TRP Tx beam failure or UE Rx beam failure since the measurement is based on the beam pair link. Thus, it is difficult to trigger separate P-2 and P-3 beam management procedures. One way is to always trigger both P-2 and P-3 beam management procedures, but this can lead to extra overhead. For example, when the UE rotates, the TRP Tx beam still works, and in this case, there is no need to perform P-2 beam management procedure to refine the TRP Tx beam from among one or more other Tx beams of a panel, group or array or outside thereof to another panel, group or array, for example.

For uplink, similar issue exists for U-2/U-3 beam management procedures as with the P-2 and P-3 beam management procedures. In particular, regarding signaling delivery for P-2/P-3 and U-2/U-3, when there is a need to refine the Tx or Rx beams 610, a message is delivered between the TRP/gNB 500 and the UE 400 so that corresponding beam management procedure could be performed. For example, the TRP/gNB 500 can send a message to the UE 400 for a P-2 beam management procedure to measure the CSI-RSs that the TRP/gNB 500 will send. In addition, the UE 400 can send message to the TRP/gNB 500 for triggering P-3 beam management procedure.

In some situations, if the downlink beam fails (e.g., the DL BPL, TRP Tx beam, or UE Rx beam), usually the uplink beam (e.g., the UL BPL, TRP Rx beam, or UE Tx beam) will fail too. This case happens especially when the UE 400 failure, for example, is caused by UE rotation. When the UE 400 rotates, the UE current Rx beam for DL could point at a direction that is far away from the current beam, and thus so does the UE Tx beam for UL. In other words, both UE Rx beam and UE Tx beam usually fail together. In this case, if the UE wants to send message to trigger P-3 procedure, it will find that the information can not be transmitted to TRP side because uplink fails too. Accordingly, there is a need for mechanisms to guarantee that the signaling could be delivered between the TRP/gNB 500 and the UE 400 especially when the UE beam fails.

In addition, for uplink beam management control the U-3 beam management procedure refines the UE Tx beam and the UE 400 could do beam sweeping within several Tx beams so that the TRP could measure different UE Tx beams. However, both the TRP/gNB 500 and the UE 400 should know how many, or the number of UE Tx beams are to be swept.

In embodiments related to beam management procedure triggering, the UE 400 can operate to separately/independently trigger separate P2/P-3 beam management procedures. First, the UE 400 can determine or detect whether the beam pair quality (or BPL quality) has dropped below a threshold quality and that the dropping is caused by TRP Tx beam or the UE Rx beam. In an aspect, the UE 400 can enable this determination different ways. For example, the UE 400 can operate to use omni reception at the UE side. The UE 400 could maintain omni reception for a certain time duration. Alternatively, or additionally, the UE 400 can operate to perform omni reception and directional reception alternatingly, or one after the other in a sequence that can repeated or not within corresponding predefined periods of time/durations. The UE 400 can determine whether the signal strength or BPL quality from both omni reception and directional reception drops below a quality threshold. If the UE determines a drop below the quality threshold, then it can determine/declare that the TRP Tx beam has become bad, and in response, trigger at least the P-2 beam management procedure alone or with other procedures. If the UE 400 finds the signal strength from directional reception drops, but the one from omni reception does not satisfy drop in the threshold or does not change much, the UE 400 determines/declares that the UE Rx beam is the result of the beam pair failure or fall-back mode of operation and then can trigger the P3 beam management procedure to be performed separately/independently without other beam management procedures being triggered or with other beam management procedures.

In aspects related to beam management procedure triggering for uplink, the triggering of U-3 beam management procedure could be based on the P-3 beam management procedure since the UE beam failure happens to both downlink and uplink. As such, the P-3 beam management procedure triggering can trigger or lead to the U-3 beam management procedure as well.

In embodiments related to signaling delivery for beam recovery in the fall-back mode or where the BPL quality drops significantly, messaging between the TRP/gNB 500 and the UE 400 should be secured in order to perform P-2/P-3 and U-2/U-3 procedures. However, since the DL and UL usually fail together, sometimes the message for beam recovery request can not be sent to the other side. When the UE 400 rotates a lot, for example, it can discover that the downlink does not work and intends to trigger the P-3 procedure, but the beam recovery request is incapable of being sent to the TRP/gNB 500 because the UE Tx beam for uplink also is inoperable. In this situation, the UE 400 can be configured to fall back to omni transmission to send the message. This is not always a default method of transmission because with omni transmission the antenna gain is smaller and it might not work very well for the UE 400 or other UEs at a coverage edge area (e.g., at the edge of cell 608 or the like).

In an embodiment, in order to send a beam recovery request or beam recovery request message, the UE 400 can perform a check on power header room (PHR). If the power header room is larger than a certain PHR threshold, then the UE 400 can fall back to utilizing omni transmission with also utilizing a full occupation of the remaining power header room or boost the power up to the PHR. If the power header room is smaller than the threshold, it means the UE may be at the coverage edge, then the UE 400 can fall back to omni transmission and send the beam recovery request with multiple repetitions. The threshold may be pre-defined or configured by higher layer signaling (e.g., Radio Resource Control (RRC) signaling or the like).

Based on the PHC threshold and current PHR, the UE 400 can then operate to generate and provide the beam recovery request for fall-back mode of operation according to one or more processes (e.g., Type A or Type B). For example, in one process (e.g., Type A), the UE 4000 can operate to provide the beam recovery request using the omni-directional antenna(s) with a higher or increase in the transmitting power or full Tx power based on a power boosting offset, which can be performed without repetition, for example. The detailed power boosting offset can be pre-defined or configured by higher layer signaling or determined by UE's implementation, for example.

In another aspect, the UE 400 can then operate to generate and provide a beam recovery request for fall-back mode of operation according to another process (e.g., Type B). For Type B, the UE 400 can operate by using the omni-directional antenna with or without power boosting and the gNB 500 could allocate multiple beam recovery resources for repetition based transmission. Thus, the UE 400 can be configured to compensate the beamforming loss by a repetition gain. As such, the beam recovery resource used can be in a same slot or different slots of resources (Resource Elements (REs)/physical resource blocks (PRBs), or the like). Additionally, or alternatively, a wider Tx beam can also be used to use instead of an omni-directional antenna for the beam recovery request.

Figure 7:
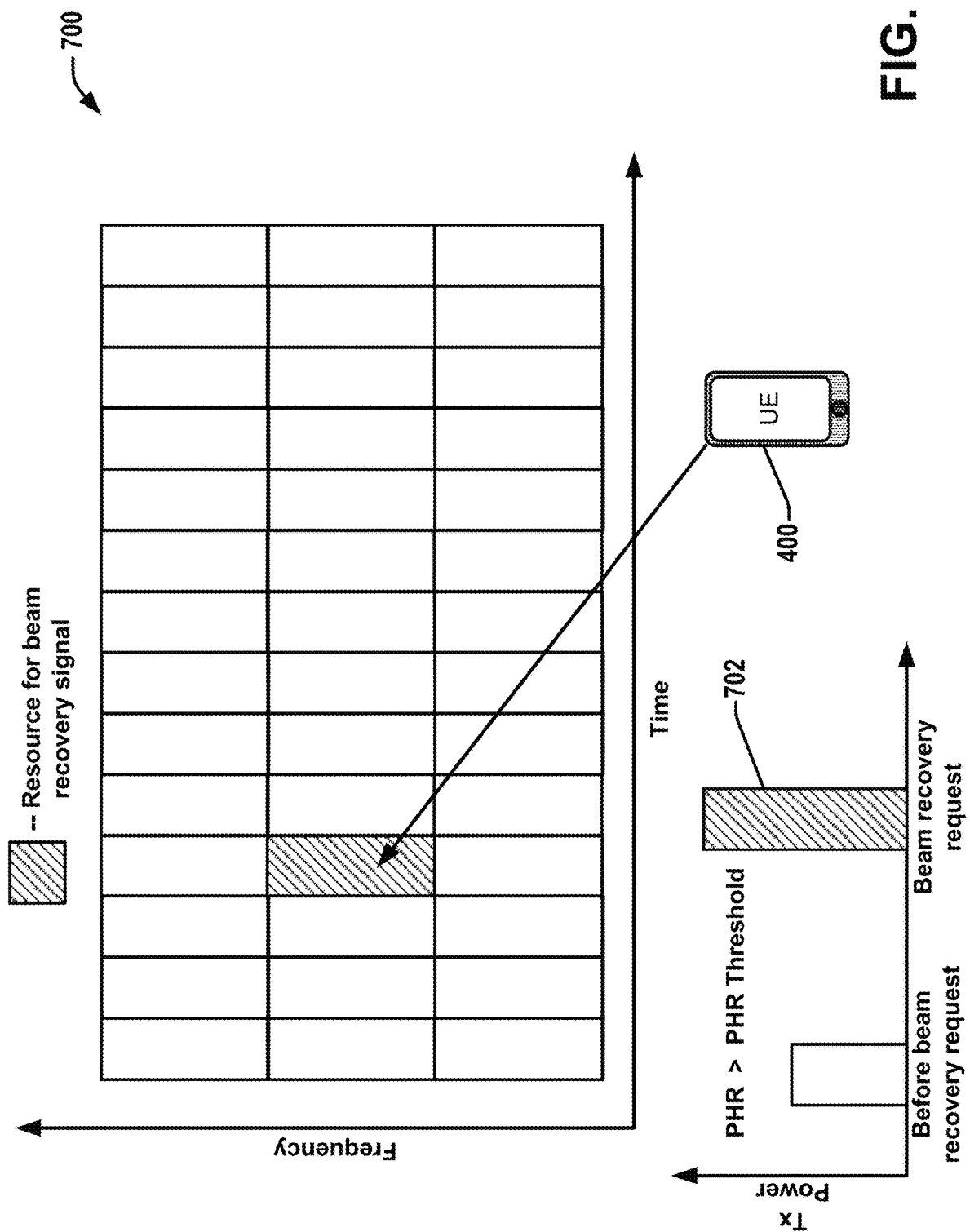
FIG. 7 illustrates an example of a beam format of a beam report such as a beam recovery request according to various aspects or embodiments described herein.

Referring to FIG. 7, illustrates is an example of the Type A configuration 700 or process for generating and communicating a beam recovery request in fall-back mode, in which the beam recovery request can indicate a type of beam management procedure (e.g., P-2 or P-3) to initiate alone or together in response to the gNB 500 or TRP operably coupled thereto.

If the power header room is larger than a certain PHR threshold, then the UE 400 can fall back to utilizing omni transmission with also utilizing a full occupation of the remaining power header room or boost the power up to the PHR as in the Type A configuration 700 with a beam recover request resource 702. For example, resources such as REs/PRBs/etc. can be utilized in a bandwidth along frequency and time to provide the beam recovery request in communication between the gNB 500 and UE 400. The type of process or configuration (e.g., Type A or Type B) can be determined or selected by the PHR and the PHR threshold. For Type A, as shown in FIG. 7, the UE 400 could use an omni-directional antenna with higher transmitting power or full Tx power with a power boosting offset that can be pre-defined, configured by higher layer signaling or determined by UE's implementation. The beam recovery resource 702 can be in the same slot or different slots, or be utilized in a wider Tx beam that can also be used instead of omni-directional antenna.

Figure 8:
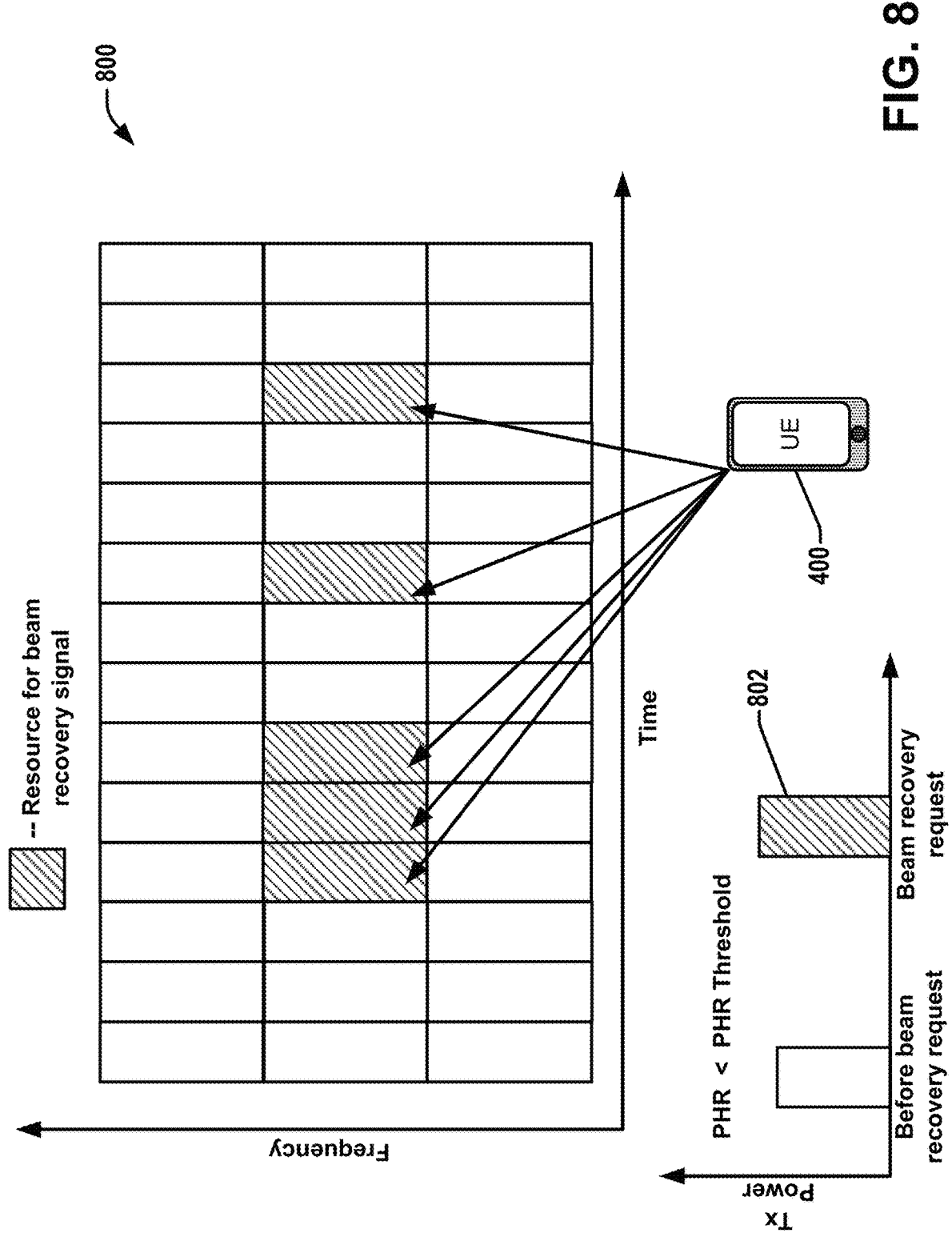
FIG. 8 illustrates another example of a beam format of a beam report such as a beam recovery request according to various aspects or embodiments described herein.

Referring to FIG. 8, illustrates is an example of the Type B configuration 800 or process for generating and communicating a beam recovery request in fall-back mode, in which the beam recovery request can indicate a type of beam management procedure (e.g., P-2 or P-3) to initiate alone or together in response to the gNB 500 or TRP operably coupled thereto.

If the power header room is smaller than the threshold, it means the UE may be at the coverage edge, then the UE 400 can fall back to omni transmission and send the beam recovery request with multiple repetitions as a Type B configuration 800. For Type B, as shown in FIG. 8, the UE 400 could use the omni-directional antenna with or without power boosting and the gNB 500 could allocate multiple beam recovery resources 802 for repetition based transmission of the beam recovery request. In this configuration or process, the UE 400 can enable compensation of the beamforming loss by repetition gain. The beam recovery resources 802 can be in the same slot or different slots, or be utilized in a wider Tx beam that can also be used instead of omni-directional antenna.

In other aspects, regardless of Type A or Type B fall back operations/configurations, the beam recover request can comprise a field that indicates which beam management procedure to initiate based on an indication in the field. For example, the field can indicate which beam management procedure should be triggered, for example, P-2 beam management procedure, P-3 beam management procedure, or both P-2 and P-3. Thus, the TRP operably/communicatively coupled to the gNB 500 and the UE 400 can just perform the procedure as needed to save overhead without necessarily having to perform both procedures during fall-back. Furthermore, the different beam management procedures can be categorized with different process IDs as the indication in the field or in conjunction with the indication. This process ID of P-2, P-3, or U-2/U-3 could be attached into the triggering message.

Other embodiments related to uplink beam management control can include where the TRP/gNB 500 signals the UE 400 a number of how many UE Tx beams could be swept during a U-3 procedure. This could be broadcasted to the UEs, i.e. all the UE have the same limit. Alternatively, the number of UE Tx beams in U-3 could be UE specific for a particular UE 400 from other UEs in the cell 608. For example, the TRP/gNB 500 could determine this number of UE Tx beams based on the U-1 results and send it to the UE 400. For U-3, the UE Tx beams might be sent multiple times and for different communications/repetitions of this number, the UE Tx beam could be changed. After feedback is received from TRP or no U-3 trigger event occurs for a duration, the UE 400 can thereby determine or consider U-3 is completed.

In an aspect for uplink beam refinement, if it can't be distinguished whether U-2 or U-3 should be performed separately, the UE 400 should always perform U-3 first since the there is no rotation case for TRP beam and the TRP beam doesn't change as drastically as the UE beam. After the UE Tx beam is determined, then U-2 can be performed in response to this determination that U-3 is complete and operate to refine the TRP Rx beam.

In other embodiments related to beam management reporting, such reporting can be based on one or more of: group based beam reporting, reference beam reporting, or both. After measurement of the Tx/Rx beams, the UE reports to the TRP which Tx beams are good for communications, and the reporting content could include the Tx beam index/BPL index, and the associated RSRP of the beam. Considering the large number of beams the overhead for beam state reporting could be high. In order to reduce the overhead, group based beam reporting can be utilized according to two options. The first one is an Rx beam set based reporting, in which different Tx beams are reported for the same set/group simultaneously being received by the UE 400. The second is Rx antenna group/antenna panel based reporting, in which different Tx beam reported from different panels being simultaneously received by the UE.

In order to further reduce the overhead and provide as much information as possible can thus be provided to the network side, a reference beam pair link based beam reporting can also be utilized. Here, in an aspect, the UE 400 can select or determine one BPL as the reference BPL that can be used by the TRP for downlink communication. Additionally, the rest or remaining beam pairs/BPLs of the same group/antenna group/panel or different, could be reported based on the reference beam pair or reference BPL among various other BPLs. For example, a differential RSRP could be reported and the relation with the reference beam could be indicated as to whether the beam is in the same group/antenna panel/Rx beam set with the reference beam. The differential RSRP can be defined as the difference between the RSRP corresponding to the reference beam and another beam for which RSRP is provided or reported in a report/beam status report/beam recovery request, for example.

Figure 9:
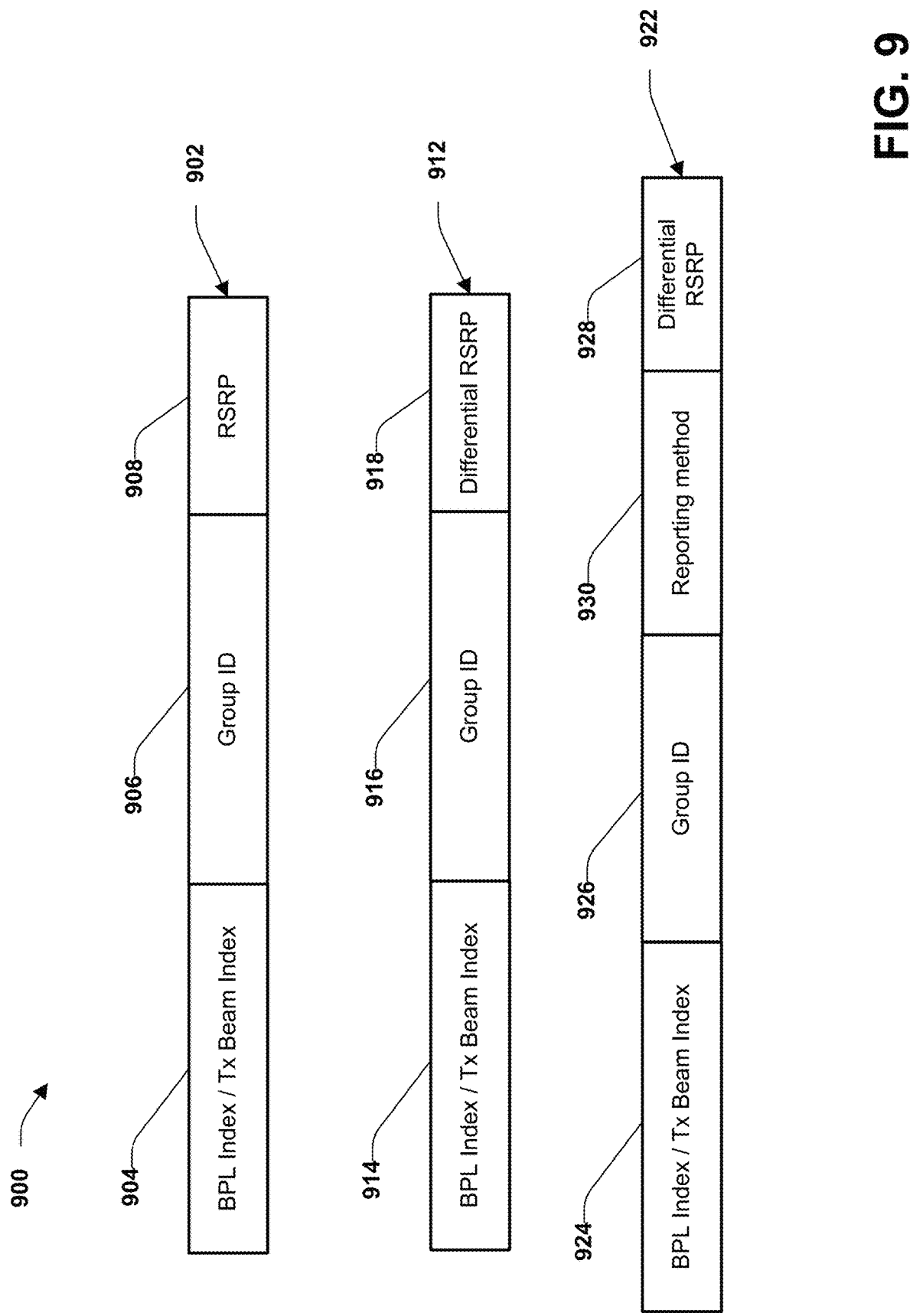
FIG. 9 illustrates example beam report format of a beam report according to various aspects or embodiments described herein.

Referring to FIG. 9, illustrated are example beam reports 900 in accordance with various embodiments/aspects described herein.

In one embodiment, a reporting format of a beam report 902 can include a reference beam BPL Index/Tx beam Index 904, a Group ID 906, and an RSRP 908. The BPL index/Tx beam index 904 indicates the downlink Tx beam information, such as the particular BPL being referenced. For the Group ID field 906, it is always set to 1 for the reference beam or this field could be omitted altogether in the reference BPL reporting. Because the beam being signaled here is a reference beam report 902, only the associated RSRP could be provided. The UE 400 can provided this report 902 after selecting a reference beam, which can be performed based on a highest RSRP among a beam group/antenna group/antenna panel.

Beam report 912 demonstrates another reporting format for a non-reference beam with a non-reference beam BPL Index/Tx beam Index 914, Group ID 916, and a Differential RSRP 918. The beam report 904 format can be applicable for remaining beams other than the reference beam or BPL from among other panel beams, Rx beams received simultaneously by the UE 400, or an antenna group, for example. For the Group ID field 916, the indication can be a one-bit indication, for example, that is set to 1 if the Tx beam is from the same group/antenna panel/Rx beam set (or Rx beam group) with the reference beam; otherwise it is set zero if it is another group/antenna panel/Rx beam set. For the non-reference beam, a differential RSRP 918 can be used to save overhead. The differential RSRP of the differential RSRP field 912, as described above, can be defined as the difference between the RSRP corresponding to the reference beam and beam for which RSPR is provided. As such, a beam located in different group can also be received simultaneously.

Alternatively, or additionally, the TRP or gNB 500 can calculate a differential RSRP for other beams than the reference BPL, which could be the beam with the highest RSRP. From the different RSRP, the TRP or gNB 500 can determine a priority ranking of beams from highest to lowest. Higher ranked beams can have a lower differential or be the closest in RSRP as the reference beam or beam with the highest RSRP, for example.

In another aspect, for the beams located in the same group as the reference BPL or Tx beam, one more flag indicating whether the beam is received from the same Rx beam as the reference BPL or Tx beam could be reported. This could be an additional flag or field with the additional flag to the fields already illustrated in the various beam report formats.

With these configurations (e.g., 902, 904, or the like), the network side or eNB/gNB 500 can know which beams are from the same group with the reference beam. Thus it can choose proper beams besides the reference beam for transmission. For example, the TRP could select another beam from different UE antenna panel for a higher rank transmission, or otherwise a different beam for refinement or reselection in the beam management procedures, for example.

In other aspects, the reference beam or BPL index can be indicated by the gNB 500 by higher layer signaling or a Downlink Control Information (DCI). Alternatively, the UE could recommend the reference BPL index when reporting the beam state to indicate the reference beam/BPL from other beams/BPLs.

In another embodiment, the beam report 902 as representative of the reference beam can be reported together with the group information instead of just a bit indicator. As such, the reference beam format 902 can be included with group information BPL Index/Tx beam Index, Group ID, and the RSRP that specifies the particular group from among multiple groups (e.g., beam Rx groups of beams received together or simultaneously/antenna panels/antenna groups.

In a related aspect, the non-reference beam format can also be with group information BPL Index/Tx beam Index, Group ID, and a Differential RSRP that identifies the group with more than just an indicator but actually identifies the group particular group from among a plurality of beam Rx groups/antenna panels/antenna groups.

In the above embodiment, the field of Group ID can indicate which group the beam belongs to from among various groups, which is a variation from just providing an indication of being in the same group as the reference beam/BPL or not. The group could be antenna panel or Rx beam set (group/plurality of beams received).

For example, if the UE has four antenna panels, the group ID field will occupy 2 bits. With the group ID information, the TRP/gNB 500 could know more clearly about which beams are reported from the same group and accordingly it can decide which beams could be simultaneously received at the UE 400 for high rank transmission.

In another embodiment, for antenna panel based group reporting, where the group comprises an antenna panel of the UE 400, for example, the number of groups could equal to or be smaller than the number of physical UE antenna panels of the UE 400, for example. If some panel is not able to receive a signal due to poor channel conditions, for example, then the number of groups can be smaller. As such, the number of groups could be seen as the number of logical antenna panels at the UE 400, or operably/communicatively coupled to the UE 400. For the number of Tx beams used for transmission, this can be the minimum value of the number of antenna panels at the TRP side and the UE side.

In another embodiment, the number of groups could be limited, which can be pre-defined or configured by higher layer signaling, the DCI or determined by the number of antenna panels or antenna groups in gNB 500 and UE 400 side.

Alternatively, or additionally, the number of groups could be defined by the particular beam grouping scheme. There may be multiple types of beam grouping schemes in the system or utilized by the system including the gNB 500 with TRP and the UE 400. For example, one type of beam grouping can be based on Rx beam set * or group) and the other type of beam grouping can be based on the antenna group or antenna panel. The particular scheme or which scheme that should be used can be configured by higher layer signaling or DCI.

In another embodiment, a reporting format of a beam report 922 can include a reference beam BPL Index/Tx beam Index 924, a Group ID 926, Reporting method field 930, and a (differential) RSRP 928. The BPL index/Tx beam index 924 indicates the downlink Tx beam information, such as the particular BPL being referenced.

Alternatively, or additionally, to the embodiments of beam reports 902 or 912 if the dynamic switching of beam grouping scheme is enabled, for beam indication, the beam grouping scheme should also be indicated in the reporting method field 930. For example, one more fields could be added to the beam reporting format, which, for example, could be a one-bit field indicating whether the reporting is antenna group (panel) based or Rx beam set based.

For example, if the Reporting method field is set to 1, it means the reporting is based on antenna group and different Tx beams can be simultaneously received by different UE antenna groups. If it is set to 0, it means the reporting is based on Rx beam set and the different Tx beams can be simultaneously received by the same Rx beam set.

According to various aspects and embodiments related to beam reporting herein, one aspect can include where the TRP/gNB 500 as well as the UE, which can work with multiple beam operations. The TRP/gNB 500, for example can send multiple beams to the UE 400 which have multiple antenna panels for higher rank transmission. The TRP could select the reference beam reported from the UE 400 for transmission. Additionally, the TRP can select other Tx beams targeting to different UE panels based on the reported information from the UE.

As indicated above, the UE can work with multiple beam operation and have multiple antenna panels as well. As such, the UE 400, for example, can receive multiple TRP Tx beams with different antenna panels. The UE can also perform multiple beam state reporting to the TRP. The UE, for example, can set one BPL or Tx beam as a reference. The reporting content includes the BPL index or Tx beam index, group ID and RSRP. For the reference beam, the group ID field could be omitted or always set to 1, for example. Other fields, such as for reporting method could also be included in the report.

For the non-reference Tx beam, the reporting format can include a BPL index or Tx beam index, group ID and a differential RSRP. For the non-reference beam, the group ID could be set to 1 if the beam is from the same group with the reference beam otherwise it could be set to 0, for example, or vice versa by reverse convention. If the beam is from the same group with the reference beam, one more flags/fields could be added indicating whether the beam is received by the same Rx beam.

The reporting format for the reference beam can also include the BPL index/Tx beam index, group ID, and RSRP. For the non-reference beam, the reporting format includes the BPL index/Tx beam index, group ID and a differential RSRP. The group ID can also further indicate which group the beam belongs to. The number of groups could equal to the number of UE antenna panels. Alternatively, the number of groups could equal to the minimum value of the antenna panels at the UE and the TRP. Alternatively, or additionally, the number of groups could be configured by higher layer signaling or DCI.

Additionally, a field of reporting method could be added to the reporting content, which is used to indicate the reporting method. If it is set to 1, for example, this could mean that the reporting is based on UE antenna panels and the value of 0 means the reporting based on Rx beam sets, or vice versa by reverse convention.

In other aspect, with respect to layer one RSRP Reporting, or L1-RSRP computation, the UE 400 can be configured with CSI-RS resources, SS/PBCH Block resources or both CSI-RS and SS/PBCH Block resource. The UE 400 can be configured with CSI-RS resource setting up to 16 CSI-RS resource sets, for example, having up to 64 resources within each set. The total number of different CSI-RS resources over all resource sets is no more than 128.

For L1-RSRP reporting, if the higher layer parameter nrofReportedRS is configured to be one, the reported L1-RSRP value can be defined by a 7-bit value in the range [−140, −44] dBm with 1 dB step size, if the higher layer parameter nrofReportedRS is configured to be larger than one, or if the higher layer parameter group-based-beam-reporting for group based beam reporting is configured as 'ON', the UE 400 shall use the differential RSRP (e.g., L1-RSRP) based reporting, where the largest value of L1-RSRP uses a 7-bit value in the range [−140, −44] dBm with 1 dB step size, and the differential L1-RSRP uses a 4-bit value. The differential L1-RSRP value can be computed with 2 dB step size with a reference to the largest L1-RSRP value which is part of the same L1-RSRP reporting instance. The mapping between the reported L1-RSRP value and the measured quantity as described further, for example, in TS 38.133.

When the UE 400 is configured with the higher layer parameter ReportQuantity set to 'CRI/RSRP':

if the UE is configured with the higher layer parameter group-based-beam-reporting set to 'OFF', the UE 400 is not required to update measurements for more than 64 [CSI-RS and or SSB] resources, and the UE shall report in a single report nrofReportedRS (higher layer configured) different [CRI and SSBRI (SSB Resource Indicator)] for each report setting. If the higher layer parameter nrofReportedRS is configured to be one, the reported L1-RSRP value is defined by a 7-bit value in the range [−140, −44] dBm with 1 dB step size. If the higher layer parameter nrofReportedRS is configured to be larger than one, the UE 400 shall use largest L1-RSRP and differential L1-RSRP based reporting, where the largest value of L1-RSRP uses a 7-bit value and the differential L1-RSRP uses a 4-bit value. The differential L1-RSRP values are computed with 2 dB step size with a reference to the largest L1-RSRP value which is part of the same L1-RSRP reporting instance.

if the UE is configured with the higher layer parameter group-based-beam-reporting set to 'ON', the UE may report in a single reporting instance up to number-of-beams-reporting L1-RSRP and CSI reports, where up to number-of-beams-reporting [CSI-RS and or SSB] resources can be received simultaneously by the UE either with a single spatial domain receive filter, or with multiple simultaneous spatial domain receive filters.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

Figure 10:
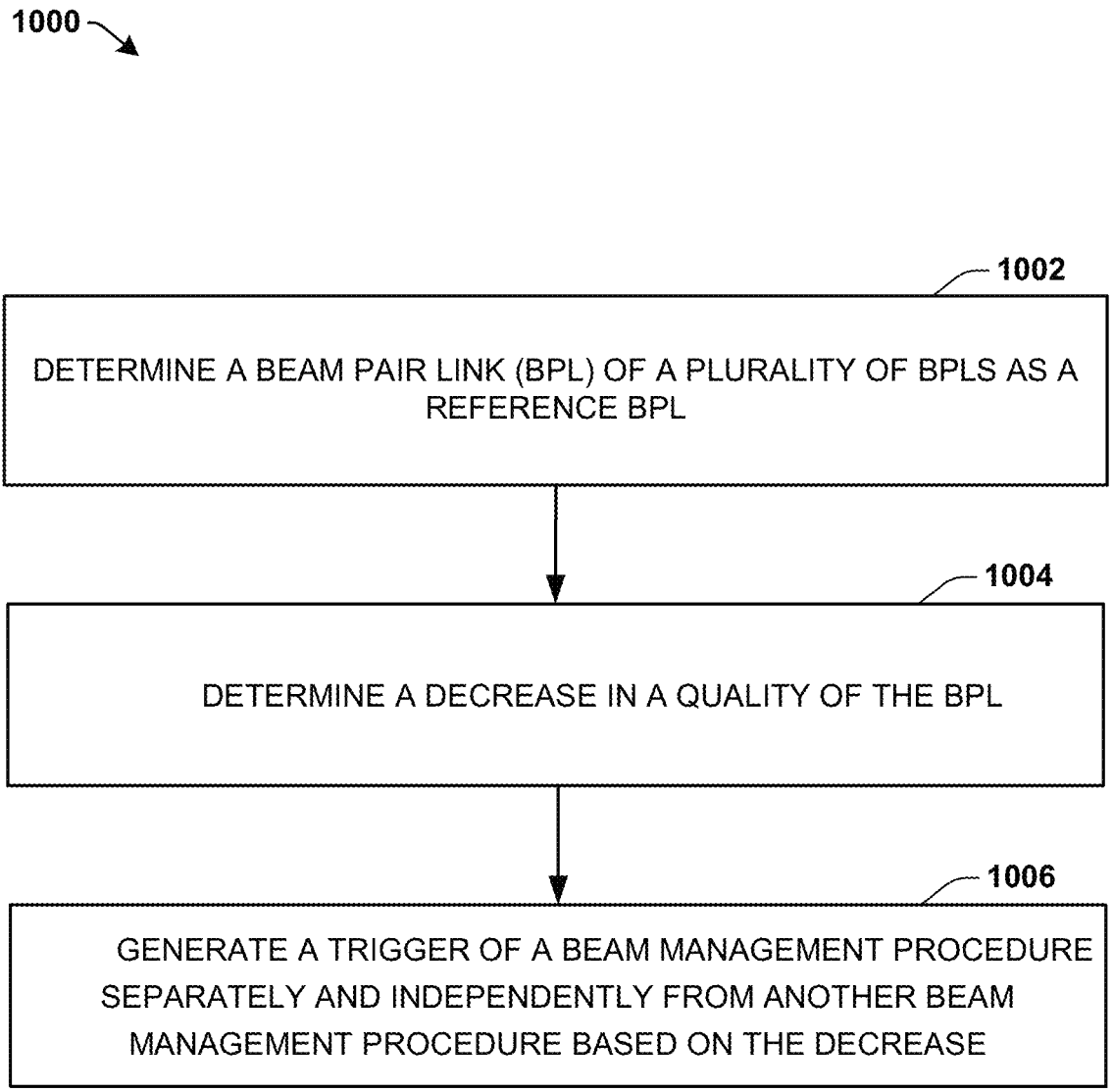
FIG. 10 illustrates a process flow of processing or generating a beam report and beam management procedure triggering according to various aspects or embodiments described herein.

Referring to FIG. 10, illustrated is an example process flow 1000 for transmitting/receiving/processing/generating beam management procedure triggering and signaling with beam status reporting in accordance with the description herein. At 1002, a UE (e.g., UE 400) via one or more processors with a memory can determine a beam pair link (BPL) of a plurality of BPLs as a reference BPL. This, for example, can be a highest signal quality among BPLs or beams of a group, panel or received together.

At 1004, the process flow 1000 further includes the UE determining a decrease in a quality of the BPL. This can be indicated when the beam or reference beam drops below a quality threshold for a signal to noise ratio or other power indication, power signal measure, or other indication of signal quality (e.g., an RSRP, RSSI, SNR, or the like).

At 1006, the process flow continues with generating a trigger of a beam management procedure separately and independently from another beam management procedure based on the decrease. For example, a P-2 beam management procedure could be triggered and not a P-3 procedure, or vice versa.

In other embodiments, the process flow 1000 can also include generating a determination whether the decrease in the quality of the beam pair link (BPL) is based on a Transmission Reception Point (TRP) transmit (Tx) beam or based on a UE receive (Rx) beam. Based on the determination, the UE can further generate the trigger of a P-2 beam management procedure separately and independently from a P-3 beam management procedure, or the P-3 beam management procedure separately and independently from the P-2 beam management procedure.

For example, The UE can determine whether the decrease in the quality of the BPL is based on the TRP Tx beam or the UE Rx beam by maintaining/performing an omni reception for a time duration, or performing the omni reception and a directional reception alternatingly. If there is a signal strength drop below a (quality) threshold in both the omni reception and the directional reception, the decrease in the quality of the BPL is based on the TRP Tx beam. If there is a signal strength drop below the threshold in the directional reception alone, while the omni reception holds constant or with relative little change, the decrease in the quality is based on the UE Rx beam.

In response to the signal strength drop being detected in both the omni reception and the directional reception, the process flow 1000 can include triggering a P-2 beam management procedure as the beam management procedure for a TRP Tx beam refinement, wherein the another beam management procedure comprises a P-3 beam management procedure. In response to the signal strength drop being detected in the directional reception alone, the process flow 1000 can include triggering the P-3 beam management procedure as the beam management procedure for a UE Rx beam refinement, wherein the another beam management procedure comprises a P-2 beam management procedure.

In addition, the UE can further communicate a beam recovery request based on a power header room (PHR). In response to the PHR being greater than a PHR threshold, the beam recovery request is communicated in a fall back mode via an omni transmission with a power boosting, and in response to the PHR being smaller than the PHR threshold, the beam recovery request is communicated via the omni transmission with one or more repetitions. The beam recovery request comprises a field indicating which beam management procedure to trigger of at least one of: a P-2 beam management procedure or a P-3 beam management procedure. In addition, the request can include a group ID, including an identification of a particular group (antenna group/antenna panel/receive beam group, etc.) or whether the beam is in the same group as the reference beam or not. The request can also include a reporting method as well as an RSRP (e.g., a differential RSRP with respect to the RSRP of the reference beam/BPL).

In other embodiment, the process flow 1000 can include providing a number of UE Tx beams to be swept for beam sweeping. In response to generating the trigger of the P-3 beam management procedure, triggering a U-3 beam management procedure also to be performed. Alternatively, or additionally, the UE can receive/process a number of UE Tx beams to perform beam sweeping for a U-3 beam management procedure, via a cell-specific broadcast or a UE-specific signaling. The UE can further determine that the U-3 procedure is complete after receiving feedback from a TRP or receiving no U-3 trigger event for a certain time.

In other embodiments, a plurality of antenna panels of the UE can be configured to generate a plurality of beam operations and receive a plurality of TRP Tx beams at different antenna panels, wherein a beam state report can further be generated based on a group based beam report, wherein the group based beam report is based on different TX beams received together, received at an antenna group, or received at an antenna panel. An indication of which of the plurality of BPLs is the reference BPL can be provided along with another indication of one or more other BPLs of the plurality of BPLs based on one or more differential Reference Signal Received Powers (RSRPs) that correspond to the reference BPL and the one or more other BPLs.

A beam state reporting can be generated that comprises a Tx beam index or a BPL index, a group ID, and a differential RSRP that indicates an RSRP difference between a BPL and the reference BPL, associated with non-reference BPLs of the plurality of BPLs, wherein the beam state reporting for the reference BPL comprises a reference BPL index or a reference Tx beam index, without the group ID or set by a bit value in the group ID, and an RSRP as a reference RSRP.

Figure 11:
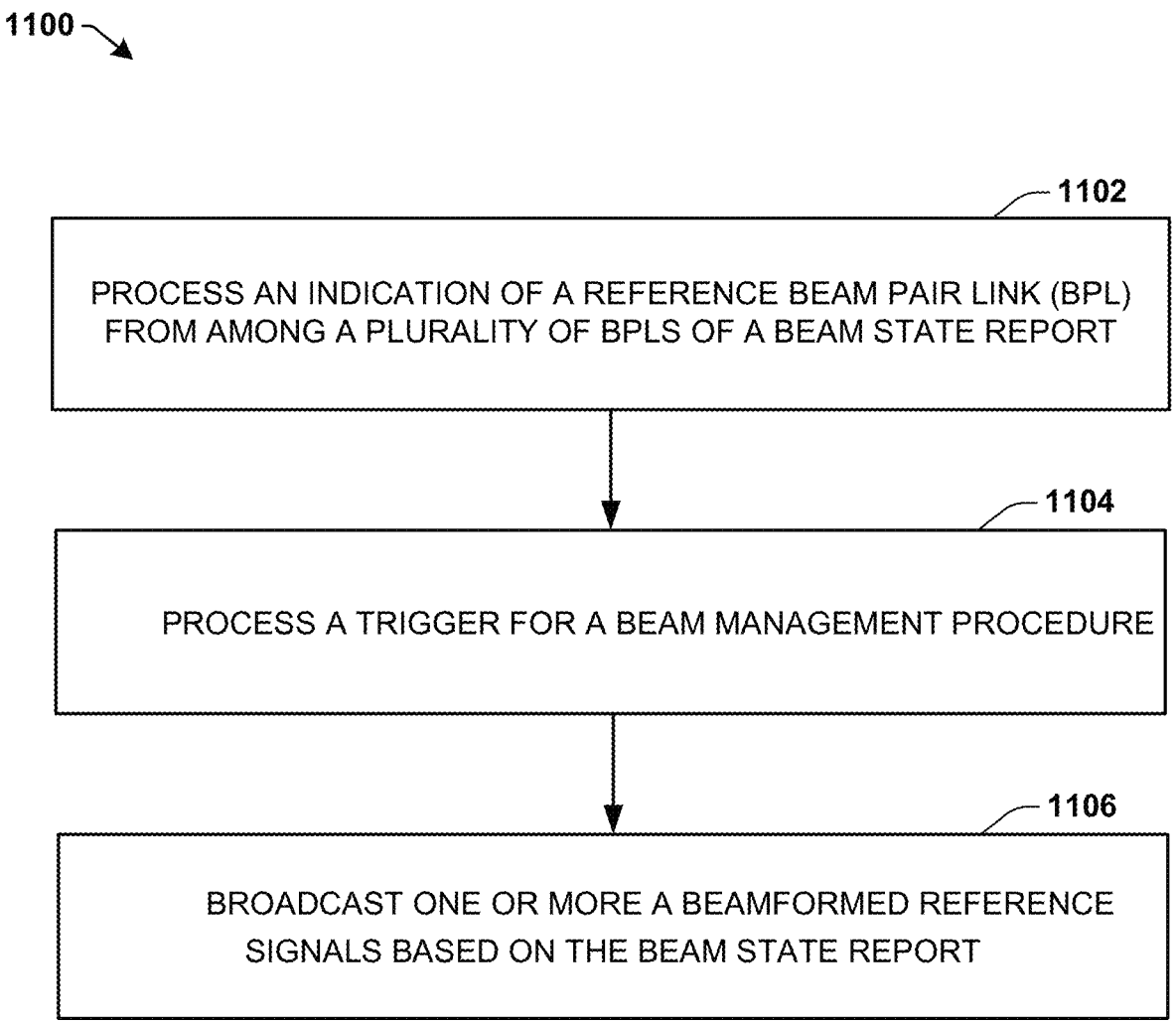
FIG. 11 illustrates another process flow of processing or generating a beam report and beam management procedure triggering according to various aspects or embodiments described herein.

Referring to FIG. 11, illustrated is an example process flow 1100 for transmitting/receiving/processing/generating beam management procedure triggering and signaling with beam status reporting in accordance with the description herein. At 1102, the process flow 1100 initiates with a gNB with TRP processing an indication of a reference beam pair link (BPL) from among a plurality of BPLs of a beam state report.

At 1104, the process flow 1100 includes processing a trigger for a beam management procedure.

At 1106, the process flow 1100 includes broadcasting one or more a beamformed reference signals based on the beam state report.

The process continues with processing an indication of a P-3 beam management procedure, and in response to the indication of the P-3 beam management procedure, triggering a U-3 beam management procedure comprising a UE transmit (Tx) beam refinement or reselection operation.

A power head room (PHR) threshold can be provided to the UE via a higher layer signaling to enable a beam recover request based on the PHR threshold.

A beam recovery request can be received in multiple repetitions or with a power boosting offset, based on/depending on a PHR threshold, wherein the beam recovery request comprises a field indicating which one of a plurality of beam management procedures is being triggered: a P-2 beam management procedure or a P-3 beam management procedure.

The process flow 1100 can also include broadcasting a number of UE Tx beams to be swept during a U-3 beam management procedure, or providing the number of UE Tx beams in a UE-specific signaling, and after the U-3 beam management procedure, perform a U-2 beam management procedure to refine a TRP receive (Rx) beam.

Further, the process flow 1100 can include receiving/processing the beam state report based on a group based beam report according to different Tx beams received in a same set, an antenna group, or an antenna panel, wherein the beam state report comprises a Tx beam index or a BPL index, a group ID, and a differential RSRP that indicates an RSRP difference between a BPL and the reference BPL, for non-reference BPLs of the plurality of BPLs, and the beam state report comprises a reference BPL index or a reference Tx beam index, without the group ID or set by a bit value in the group ID, and an RSRP as a reference RSRP for the reference BPL. Then signaling can be generated and beam management procedures can be enabled based on the report, such as signaling on the reference beam to the UE communicating the report corresponding to it, and refined based on a priority ranking in the beam group based report and reference beam based report in one or separately. For example, the eNB/gNB 500 can select another BPL to transmit on other than the reference BPL from among the plurality of BPLs based on the beam state report, wherein the another BPL is associated with a different group, antenna panel, or Rx beam set. The indication can include an RSRP of a plurality of RSRPs corresponding to the plurality of BPLs that is higher than other RSRPs of the plurality of RSRPs.

Figure 12:
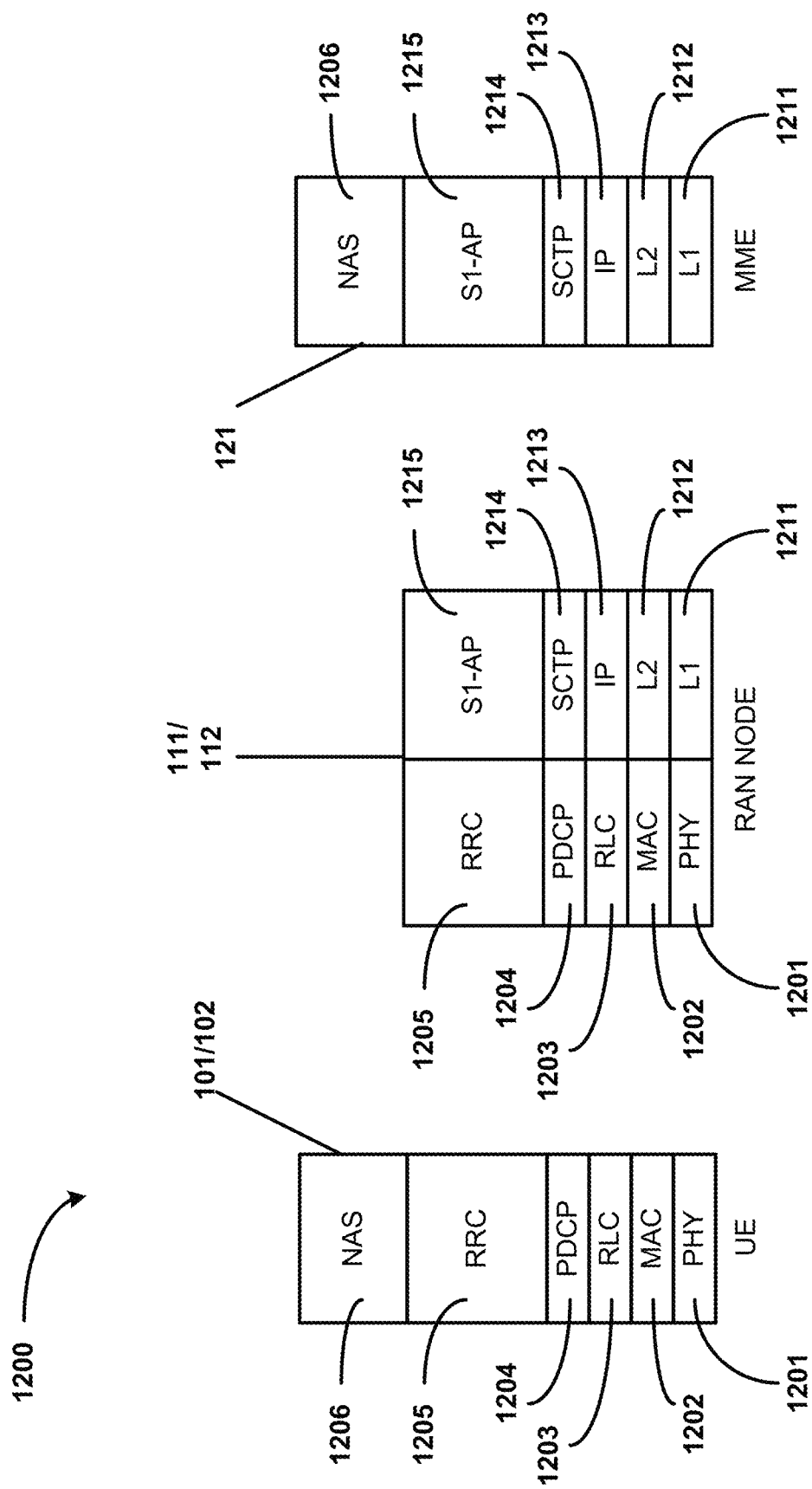
FIG. 12 illustrates a control plane protocol stack that can be implemented along with various embodiments and aspects described herein.

FIG. 12 is an illustration of a control plane protocol stack in accordance with various embodiments described herein. In this embodiment, a control plane 1200 is shown as a communications protocol stack between the UE 101 (or alternatively, the UE 102), the RAN node 111 (or alternatively, the RAN node 112), and the MME 121.

The PHY layer 1201 may transmit or receive information used by the MAC layer 1202 over one or more air interfaces. The PHY layer 1201 may further perform link adaptation or adaptive modulation and coding (AMC), power control, cell search (e.g., for initial synchronization and handover purposes), and other measurements used by higher layers, such as the RRC layer 1205. The PHY layer 1201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1203 may operate in a plurality of modes of operation, including: Transparent Mode (TM), Unacknowledged Mode (UM), and Acknowledged Mode (AM). The RLC layer 1203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1201, the MAC layer 1202, the RLC layer 1203, the PDCP layer 1204, and the RRC layer 1205.

The non-access stratum (NAS) protocols 1206 form the highest stratum of the control plane between the UE 101 and the MME 121. The NAS protocols 1206 support the mobility of the UE 101 and the session management procedures to establish and maintain IP connectivity between the UE 101 and the P-GW 123.

The S1 Application Protocol (S1-AP) layer 1215 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1214 may ensure reliable delivery of signaling messages between the RAN node 111 and the MME 121 based, in part, on the IP protocol, supported by the IP layer 1213. The L2 layer 1212 and the L1 layer 1211 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1211, the L2 layer 1212, the IP layer 1213, the SCTP layer 1214, and the S1-AP layer 1215.

Figure 13:
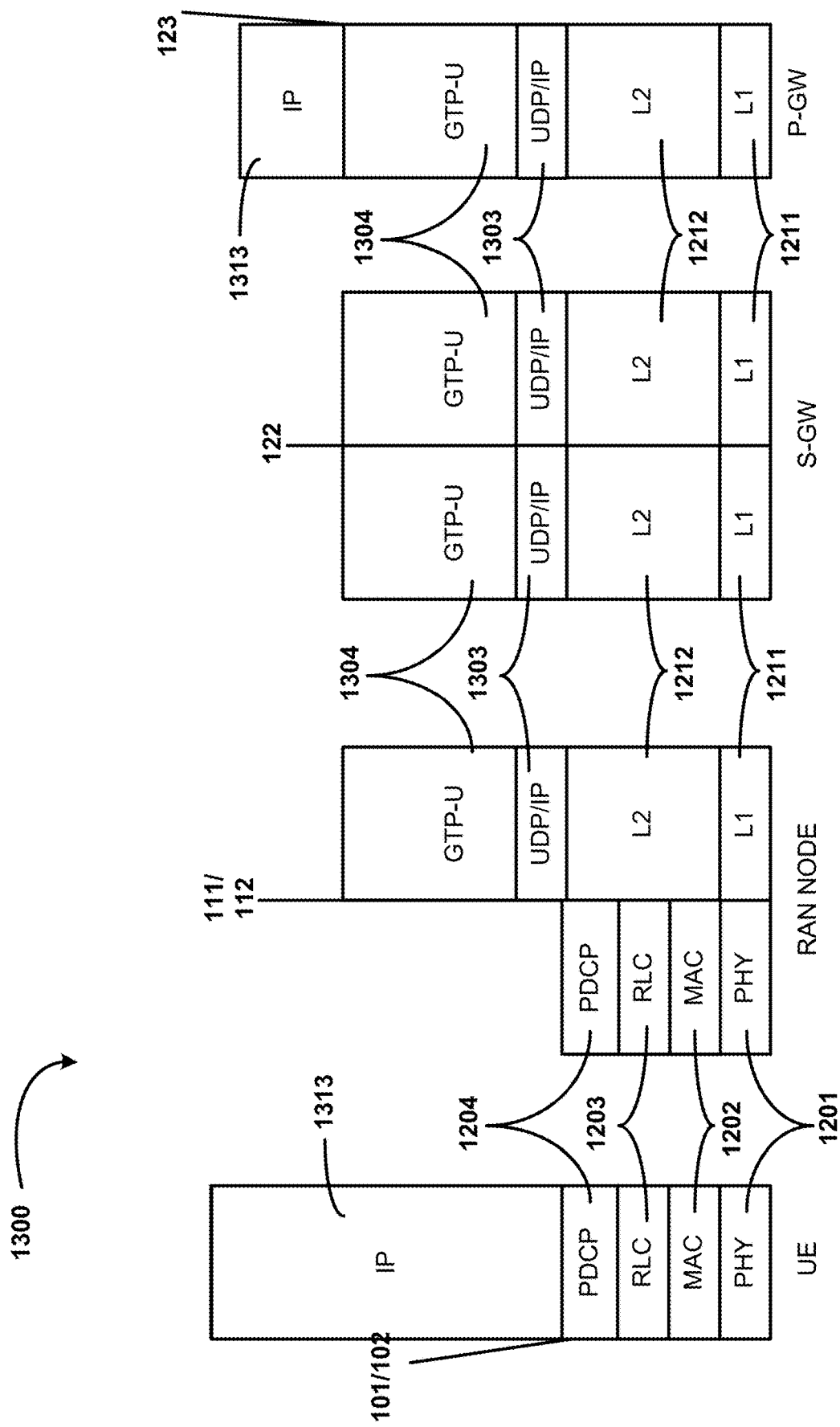
FIG. 13 illustrates user plane protocol stack that can be implemented along with various embodiments and aspects described herein.

FIG. 13 is an illustration of a user plane protocol stack in accordance with one or more embodiments herein. In this embodiment, a user plane 1300 is shown as a communications protocol stack between the UE 101 (or alternatively, the UE 102), the RAN node 111 (or alternatively, the RAN node 112), the S-GW 122, and the P-GW 123. The user plane 1300 may utilize at least some of the same protocol layers as the control plane 1200. For example, the UE 101 and the RAN node 111 may utilize a Uu interface (e.g., an LTE-Uu interface) to exchange user plane data via a protocol stack comprising the PHY layer 1201, the MAC layer 1202, the RLC layer 1203, the PDCP layer 1204.

The General Packet Radio Service (GPRS) Tunneling Protocol for the user plane (GTP-U) layer 1304 may be used for carrying user data within the GPRS core network and between the radio access network and the core network. The user data transported can be packets in any of IPv4, IPv6, or PPP formats, for example. The UDP and IP security (UDP/IP) layer 1303 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1211, the L2 layer 1212, the UDP/IP layer 1303, and the GTP-U layer 1304. The S-GW 122 and the P-GW 123 may utilize an S5/S8a interface to exchange user plane data via a protocol stack comprising the L1 layer 1211, the L2 layer 1212, the UDP/IP layer 1303, and the GTP-U layer 1304. As discussed above with respect to FIG. 12, NAS protocols support the mobility of the UE 101 and the session management procedures to establish and maintain IP connectivity between the UE 101 and the P-GW 123.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Examples 1 can be an apparatus configured to be employed in a user equipment (UE) comprising: one or more processors configured to: determine a beam pair link (BPL) of a plurality of BPLs as a reference BPL; determine a decrease in a quality of the BPL; and generate a trigger of a beam management procedure separately and independently from another beam management procedure based on the decrease; a radio frequency (RF) interface, configured to provide, to RF circuitry, data for transmission related to the trigger.

Example 2 can include Example 1, wherein the one or more processors are further configured to: generate a determination whether the decrease in the quality of the beam pair link (BPL) is based on a Transmission Reception Point (TRP) transmit (Tx) beam or based on a UE receive (Rx) beam; and generate the trigger of a P-2 beam management procedure separately and independently from a P-3 beam management procedure, or the P-3 beam management procedure separately and independently from the P-2 beam management procedure based on the determination.

Example 3 can include the subject matter of any one of Examples 1-2, wherein the one or more processors are further configured to: determine whether the decrease in the quality of the BPL is based on the TRP Tx beam or the UE Rx beam by maintaining an omni reception for a time duration, or performing the omni reception and a directional reception alternatingly, wherein a signal strength drop below a threshold in both the omni reception and the directional reception, the decrease in the quality of the BPL is based on the TRP Tx beam, and the signal strength drop below the threshold in the directional reception alone, the decrease in the quality is based on the UE Rx beam.

Example 4 can include the subject matter of any one of Examples 1-3, wherein the one or more processors are further configured to: in response to the signal strength drop being detected in both the omni reception and the directional reception, trigger a P-2 beam management procedure as the beam management procedure for a TRP Tx beam refinement, wherein the another beam management procedure comprises a P-3 beam management procedure; and in response to the signal strength drop being detected in the directional reception alone, trigger the P-3 beam management procedure as the beam management procedure for a UE Rx beam refinement, wherein the another beam management procedure comprises a P-2 beam management procedure.

Example 5 can include the subject matter of any one of Examples 1-4, wherein the one or more processors are further configured to: communicate a beam recovery request based on a power header room (PHR), wherein, in response to the PHR being greater than a PHR threshold, the beam recovery request is communicated in a fall back mode via an omni transmission with a power boosting, and in response to the PHR being smaller than the PHR threshold, the beam recovery request is communicated via the omni transmission with one or more repetitions.

Example 6 can include the subject matter of any one of Examples 1-5, wherein the beam recovery request comprises a field indicating which beam management procedure to trigger of at least one of: a P-2 beam management procedure or a P-3 beam management procedure.

Example 7 can include the subject matter of any one of Examples 1-6, wherein the one or more processors are further configured to: provide a number of UE Tx beams to be swept for beam sweeping; or in response to generating the trigger of the P-3 beam management procedure, trigger a U-3 beam management procedure; process a number of UE Tx beams to perform beam sweeping for a U-3 beam management procedure, via a cell-specific broadcast or a UE-specific signaling; and determine the U-3 procedure is complete after receiving feedback from a TRP or receiving no U-3 trigger event.

Example 8 can include the subject matter of any one of Examples 1-7, further comprising: a plurality of antenna panels configured to generate a plurality of beam operations and receive a plurality of TRP Tx beams at difference antenna panels, wherein the one or more processors are further configured to generate a beam state report based on a group based beam report, wherein the group based beam report is based on different TX beams received together, received at an antenna group, or received at an antenna panel.

Example 9 can include the subject matter of any one of Examples 1-8, wherein the one or more processors are further configured to provide an indication of which of the plurality of BPLs is the reference BPL and another indication of one or more other BPLs of the plurality of BPLs based on one or more differential Reference Signal Received Powers (RSRPs) that correspond to the reference BPL and the one or more other BPLs.

Example 10 can include the subject matter of any one of Examples 1-9, wherein the one or more processors are further configured to generate a beam state reporting comprising a Tx beam index or a BPL index, a group ID, and a differential RSRP that indicates an RSRP difference between a BPL and the reference BPL, associated with non-reference BPLs of the plurality of BPLs, wherein the beam state reporting for the reference BPL comprises a reference BPL index or a reference Tx beam index, without the group ID or set by a bit value in the group ID, and an RSRP as a reference RSRP.

Example 11 can include the subject matter of any one of Examples 1-10, wherein the group ID associated with one or more non-reference BPLs of the plurality of BPLs is configured to indicate whether the one or more non-reference BPLs belong to a same group as the reference BPL, wherein the same group comprises a same antenna panel or a same Rx beam set.

Example 12 can include the subject matter of any one of Examples 1-11, wherein the beam state report indicates at least one of: a group of antenna panels, an Rx beam set, or an antenna group for one or more non-reference BPLs of the plurality of BPLS, wherein the one or more processors are further configured to process a configuration message via a higher layer signaling or a downlink control information (DCI) that indicates at least one of: a number of groups, a beam grouping scheme, or whether a dynamic switching of beam grouping schemes is enabled.

Example 13 is an apparatus configured to be employed in a next generation or new radio NodeB (gNB) device comprising: one or more processors configured to: process an indication of a reference beam pair link (BPL) from among a plurality of BPLs of a beam state report; process a trigger for a beam management procedure; and broadcast one or more a beamformed reference signals based on the beam state report; a radio frequency (RF) interface, configured to provide, to RF circuitry, data for transmission related to the beam state report.

Example 14 can include the subject matter of Example 13, wherein the one or more processors are further configured to: process an indication of a P-3 beam management procedure; in response to the indication of the P-3 beam management procedure, triggering a U-3 beam management procedure comprising a UE transmit (Tx) beam refinement or reselection operation.

Example 15 can include the subject matter of any one of Examples 13-14, wherein the one or more processors are further configured to: provide a power head room (PHR) threshold via a higher layer signaling to enable a beam recover request based on the PHR threshold.

Example 16 can include the subject matter of any one of Examples 13-15, wherein the one or more processors are further configured to: receive a beam recovery request in multiple repetitions or with a power boosting offset based on a PHR threshold, wherein the beam recovery request comprising a field indicating which one of a plurality of beam management procedures is being triggered: a P-2 beam management procedure or a P-3 beam management procedure.

Example 17 can include the subject matter of any one of Examples 13-16, wherein the one or more processors are further configured to: broadcast a number of UE Tx beams to be swept during a U-3 beam management procedure, or providing the number of UE Tx beams in a UE-specific signaling; and after the U-3 beam management procedure, perform a U-2 beam management procedure to refine a TRP receive (Rx) beam.

Example 18 can include the subject matter of any one of Examples 13-17, wherein the one or more processors are further configured to: process the beam state report based on a group based beam report according to different Tx beams received in a same set, an antenna group, or an antenna panel, wherein the beam state report comprises a Tx beam index or a BPL index, a group ID, and a differential RSRP that indicates an RSRP difference between a BPL and the reference BPL, for non-reference BPLs of the plurality of BPLs, and the beam state report comprises a reference BPL index or a reference Tx beam index, without the group ID or set by a bit value in the group ID, and an RSRP as a reference RSRP for the reference BPL.

Example 19 can include the subject matter of any one of Examples 13-18, wherein the one or more processors are further configured to: provide a configuration message via a higher layer signaling or a downlink control information (DCI) that indicates at least one of: a number of groups, a beam grouping scheme, or whether a dynamic switching of beam grouping schemes is enabled; wherein the group ID associated with one or more non-reference BPLs of the plurality of BPLs is configured to indicate whether the one or more non-reference BPLs belong to a same group as the reference BPL, wherein the same group comprises a same UE antenna panel or a same Rx beam set.

Example 20 can include the subject matter of any one of Examples 13-19, wherein the one or more processors are further configured to: select another BPL to transmit on other than the reference BPL from among the plurality of BPLs based on the beam state report, wherein the another BPL is associated with a different group, antenna panel, or Rx beam set, wherein the indication comprises an RSRP of a plurality of RSRPs corresponding to the plurality of BPLs that is higher than other RSRPs of the plurality of RSRPs.

Example 21 is a computer-readable storage medium storing executable instructions that, in response to execution, cause one or more processors of a user equipment (UE) to perform operations, comprising: measuring a plurality of beams operable via a plurality of different antenna panels; providing a beam state report based on measurements of the plurality of beams; and triggering only a P-2 beam management procedure or a P-3 beam management procedure in a fall-back mode of operation where a failure occurs of at least one of: a UE receive (Rx) beam or a UE transmit (Tx) beam.

Example 22 can include the subject matter of Example 21, wherein the operations further comprise: generating a determination of whether a beam pair quality has decreased below a signal quality threshold as a result of a Transmission Reception Point (TRP) transmit (Tx) beam or the UE receive (Rx) beam, by performing an omni reception for a predetermined duration, or performing the omni reception and a directional reception; in response to nearly no drop in signal strength occurring during the omni reception or only a drop in occurring during the directional reception, determining that the result comprises the UE Rx beam and triggering the P-3 beam management procedure; and in response to the drop in the signal strength occurring during the omni reception and the directional reception, determining that the result comprises the TRP Tx beam and triggering the P-2 beam management procedure.

Example 23 can include the subject matter of any one of Examples 21-22, wherein the operations further comprise: communicating a beam recovery request comprising an indication of at least one of: the P-2 beam management procedure, the P-2 beam management procedure, or both, based on a power head room (PHR) threshold in the fall-back mode of operation; in response to a PHR being greater than a PHR threshold, communicating the beam recovery request in the fall back mode via an omni transmission or a wider Tx beam with a power boosting; and in response to the PHR being smaller than the PHR threshold, communicating the beam recovery request via the omni transmission or a wider Tx beam with one or more repetitions.

Example 24 can include the subject matter of any one of Examples 21-23, wherein the operations further comprise: providing an indication in the beam state report of which of the plurality of beams is a reference BPL and another indication of one or more other BPLs of the plurality of BPLs based on Reference Signal Received Powers (RSRPs) corresponding to the reference BPL and one or more other BPLs of a receive group, an antenna panel of the plurality of different antenna panels, or an Rx beam group.

Example 25 can include the subject matter of any one of Examples 21-24, wherein the operations further comprise: generating the beam state report comprising a Tx beam index, a group ID, and a differential RSRP that indicates an RSRP difference between RSRPs of a BPL and the reference BPL, for one or more non-reference BPLs of the plurality of BPLs, and a reference Tx beam index, without the group ID or set by a bit value in the group ID, and an RSRP as a reference RSRP, wherein the reference RSRP comprises a highest RSRP of the RSRPs.

Example 26 can include an apparatus comprising means to perform one or more elements of a method described in or related to any of examples 1-25, or any other method or process described herein.

Example 27 can include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 can include an apparatus comprising logic, modules, or circuitry to perform one or more elements of a method described in or related to any of examples 1-25, or any other method or process described herein.

Example 29 can include a method, technique, or process as described in or related to any of examples 1-25, or portions or parts thereof.

Example 30 can include an apparatus comprising: one or more processors and one or more computer readable media comprising instructions that, when executed by the one or more processors, cause the one or more processors to perform the method, techniques, or process as described in or related to any of examples 1-25, or portions thereof.

Example 31 can include a method of communicating in a wireless network as shown and described herein.

Example 32 can include a system for providing wireless communication as shown and described herein.

Example 33 can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a user equipment (UE) comprising:
   one or more processors configured to:
   determine a beam pair link (BPL) of a plurality of BPLs as a reference BPL;
   determine a decrease in a quality of the BPL;
   generate a trigger of a beam management procedure separately and independently from another beam management procedure based on the decrease;
   determine whether the decrease in the quality of the BPL is based on a Transmission Reception Point (TRP) transmit (Tx) beam or a UE receive (Rx) beam by maintaining an omni reception for a time duration, or performing the omni reception and a directional reception alternatingly, wherein a signal strength drop below a threshold in both the omni reception and the directional reception indicates the decrease in the quality of the BPL is based on the TRP Tx beam, and the signal strength drop below the threshold in the directional reception alone indicates the decrease in the quality is based on the UE Rx beam
   a radio frequency (RF) interface, configured to provide, to RF circuitry, data for transmission related to the trigger.

2. The apparatus of claim 1, wherein the one or more processors are further configured to:
   generate a determination whether the decrease in the quality of the beam pair link (BPL) is based on the TRP Tx beam or based on the UE Rx beam; and
   generate the trigger of a P-2 beam management procedure separately and independently from a P-3 beam management procedure, or the P-3 beam management procedure separately and independently from the P-2 beam management procedure based on the determination.

3. The apparatus of claim 1, wherein the one or more processors are further configured to:
   in response to the signal strength drop being detected in both the omni reception and the directional reception, trigger a P-2 beam management procedure as the beam management procedure for a TRP Tx beam refinement, wherein the another beam management procedure comprises a P-3 beam management procedure; and
   in response to the signal strength drop being detected in the directional reception alone, trigger the P-3 beam management procedure as the beam management procedure for a UE Rx beam refinement, wherein the another beam management procedure comprises a P-2 beam management procedure.

4. The apparatus of claim 1, wherein the one or more processors are further configured to:
   communicate a beam recovery request based on a power head room (PHR), wherein, in response to the PHR being greater than a PHR threshold, the beam recovery request is communicated in a fall back mode via an omni transmission with a power boosting, and in response to the PHR being smaller than the PHR threshold, the beam recovery request is communicated via the omni transmission with one or more repetitions.

5. The apparatus of claim 4, wherein the beam recovery request comprises a field indicating which beam management procedure to trigger of at least one of: a P-2 beam management procedure or a P-3 beam management procedure.

6. The apparatus of claim 5, wherein the one or more processors are further configured to:

provide a number of UE Tx beams to be swept for beam sweeping; or in response to generating the trigger of the P-3 beam management procedure, trigger a U-3 beam management procedure;

process a number of UE Tx beams to perform beam sweeping for a U-3 beam management procedure, via a cell-specific broadcast or a UE-specific signaling; and determine the U-3 procedure is complete after receiving feedback from a TRP or receiving no U-3 trigger event.

7. The apparatus of claim 1, further comprising:
a plurality of antenna panels configured to generate a plurality of beam operations and receive a plurality of TRP Tx beams at different antenna panels, wherein the one or more processors are further configured to generate a beam state report based on a group based beam report, wherein the group based beam report is based on different TX beams received together, received at an antenna group, or received at an antenna panel.

8. The apparatus of claim 1, wherein the one or more processors are further configured to provide an indication of which of the plurality of BPLs is the reference BPL and another indication of one or more other BPLs of the plurality of BPLs based on one or more differential Reference Signal Received Powers (RSRPs) that correspond to the reference BPL and the one or more other BPLs.

9. The apparatus of claim 1, wherein the one or more processors are further configured to generate a beam state reporting comprising a Tx beam index or a BPL index, a group ID, and a differential RSRP that indicates an RSRP difference between a BPL and the reference BPL, associated with non-reference BPLs of the plurality of BPLs, wherein the beam state reporting for the reference BPL comprises a reference BPL index or a reference Tx beam index, without the group ID or set by a bit value in the group ID, and an RSRP as a reference RSRP.

10. The apparatus of claim 9, wherein the group ID associated with one or more non-reference BPLs of the plurality of BPLs is configured to indicate whether the one or more non-reference BPLs belong to a same group as the reference BPL, wherein the same group comprises a same antenna panel or a same Rx beam set.

11. The apparatus of claim 9, wherein the beam state report indicates at least one of: a group of antenna panels, an Rx beam set, or an antenna group for one or more non-reference BPLs of the plurality of BPLs, wherein the one or more processors are further configured to process a configuration message via a higher layer signaling or a downlink control information (DCI) that indicates at least one of: a number of groups, a beam grouping scheme, or whether a dynamic switching of beam grouping schemes is enabled.

12. An apparatus configured to be employed in a next generation or new radio NodeB (gNB) device comprising:
one or more processors configured to:
process an indication of a reference beam pair link (BPL) from among a plurality of BPLs of a beam state report;
process a trigger for a beam management procedure;
broadcast one or more beamformed reference signals based on the beam state report; and
process a beam recovery request based on a power head room (PHR), wherein, in response to the PHR being greater than a PHR threshold, the beam recovery request is transmitted in a fall back mode via an omni transmission with a power boosting, and in response to the PHR being smaller than the PHR threshold, the beam recovery request is transmitted via the omni transmission with one or more repetitions; and
a radio frequency (RF) interface, configured to provide, to RF circuitry, data for transmission related to the beam state report.

13. The apparatus of claim 12, wherein the one or more processors are further configured to:
process an indication of a P-3 beam management procedure;
in response to the indication of the P-3 beam management procedure, triggering a U-3 beam management procedure comprising a UE transmit (Tx) beam refinement or reselection operation.

14. The apparatus of claim 12, wherein the one or more processors are further configured to:
provide the PHR threshold via a higher layer signaling to enable a beam recovery request based on the PHR threshold.

15. The apparatus of claim 12, wherein the one or more processors are further configured to:
receive a beam recovery request in multiple repetitions or with a power boosting offset based on the PHR threshold, wherein the beam recovery request comprising a field indicating which one of a plurality of beam management procedures is being triggered: a P-2 beam management procedure or a P-3 beam management procedure.

16. The apparatus of claim 12, wherein the one or more processors are further configured to:
broadcast a number of UE Tx beams to be swept during a U-3 beam management procedure, or providing the number of UE Tx beams in a UE-specific signaling; and
after the U-3 beam management procedure, perform a U-2 beam management procedure to refine a TRP receive (Rx) beam.

17. The apparatus of claim 12, wherein the one or more processors are further configured to:
process the beam state report based on a group based beam report according to different Tx beams received in a same set, an antenna group, or an antenna panel, wherein the beam state report comprises a Tx beam index or a BPL index, a group ID, and a differential RSRP that indicates an RSRP difference between a BPL and the reference BPL, for non-reference BPLs of the plurality of BPLs, and the beam state report comprises a reference BPL index or a reference Tx beam index, without the group ID or set by a bit value in the group ID, and an RSRP as a reference RSRP for the reference BPL.

18. The apparatus of claim 17, wherein the one or more processors are further configured to:
provide a configuration message via a higher layer signaling or a downlink control information (DCI) that indicates at least one of: a number of groups, a beam grouping scheme, or whether a dynamic switching of beam grouping schemes is enabled;
wherein the group ID associated with one or more non-reference BPLs of the plurality of BPLs is configured to indicate whether the one or more non-reference BPLs belong to a same group as the reference BPL, wherein the same group comprises a same UE antenna panel or a same Rx beam set.

19. The apparatus of claim 17, wherein the one or more processors are further configured to:
select another BPL to transmit on other than the reference BPL from among the plurality of BPLs based on the beam state report, wherein the another BPL is associated with a different group, antenna panel, or Rx beam set, wherein the indication comprises an RSRP of a plurality of RSRPs corresponding to the plurality of BPLs that is higher than other RSRPs of the plurality of RSRPs.

20. A non-transitory computer-readable storage medium storing executable instructions that, in response to execution, cause one or more processors of a user equipment (UE) to perform operations, comprising:
measuring a plurality of beams operable via a plurality of different antenna panels;
providing a beam state report based on measurements of the plurality of beams;
triggering only a P-2 beam management procedure or a P-3 beam management procedure in a fall-back mode of operation where a failure occurs of at least one of: a UE receive (Rx) beam or a UE transmit (Tx) beam; and
transmitting a beam recovery request based on a power head room (PHR), wherein, in response to the PHR being greater than a PHR threshold, the beam recovery request is communicated in a fall back mode via an omni transmission with a power boosting, and in response to the PHR being smaller than the PHR threshold, the beam recovery request is communicated via the omni transmission with one or more repetitions.

21. The non-transitory computer-readable storage medium of claim 20, wherein the operations further comprise:
generating a determination of whether a beam pair quality has decreased below a signal quality threshold as a result of a Transmission Reception Point (TRP) transmit (Tx) beam or the UE receive (Rx) beam, by performing an omni reception for a predetermined duration, or performing the omni reception and a directional reception;

in response to nearly no drop in signal strength occurring during the omni reception or only a drop in signal strength occurring during the directional reception, determining that the result comprises the UE Rx beam and triggering the P-3 beam management procedure; and in response to the drop in the signal strength occurring during the omni reception and the directional reception, determining that the result comprises the TRP Tx beam and triggering the P-2 beam management procedure.

22. The non-transitory computer-readable storage medium of claim 20, wherein the operations further comprise:
providing an indication in the beam state report of which of the plurality of beams is a reference BPL and another indication of one or more other BPLs of the plurality of BPLs based on Reference Signal Received Powers (RSRPs) corresponding to the reference BPL and one or more other BPLs of a receive group, an antenna panel of the plurality of different antenna panels, or an Rx beam group.

23. The non-transitory computer-readable storage medium of claim 22, wherein the operations further comprise:
generating the beam state report comprising a Tx beam index, a group ID, and a differential RSRP that indicates an RSRP difference between RSRPs of a BPL and the reference BPL, for one or more non-reference BPLs of the plurality of BPLs, and a reference Tx beam index, without the group ID or set by a bit value in the group ID, and an RSRP as a reference RSRP, wherein the reference RSRP comprises a highest RSRP of the RSRPs.

* * * * *